United States Patent
Nagata et al.

(10) Patent No.: US 11,029,887 B2
(45) Date of Patent: Jun. 8, 2021

(54) DATA PROCESS EXECUTION DEVICE, STORAGE MEDIUM, AND DATA PROCESS EXECUTION SYSTEM

(71) Applicant: FUJITSU LIMITED, Kawasaki (JP)

(72) Inventors: Nami Nagata, Kawasaki (JP); Makoto Kubota, Kawasaki (JP); Noriyuki Fukuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/699,780

(22) Filed: Dec. 2, 2019

(65) Prior Publication Data
US 2020/0201574 A1  Jun. 25, 2020

(30) Foreign Application Priority Data
Dec. 19, 2018 (JP) .............................. JP2018-237392

(51) Int. Cl.
*G06F 3/06* (2006.01)
*G06F 13/16* (2006.01)
*A63F 13/95* (2014.01)
*A63F 13/327* (2014.01)

(52) U.S. Cl.
CPC .......... *G06F 3/0659* (2013.01); *A63F 13/327* (2014.09); *A63F 13/95* (2014.09); *G06F 3/067* (2013.01); *G06F 3/0611* (2013.01); *G06F 13/161* (2013.01); *G06F 13/1689* (2013.01)

(58) Field of Classification Search
CPC .... G06F 3/0659; G06F 13/327; G06F 3/0611; G06F 13/1689; G06F 9/4881; G06F 9/485; A63F 13/327; A63F 13/95
See application file for complete search history.

(56) References Cited

U.S. PATENT DOCUMENTS

| | | | | |
|---|---|---|---|---|
| 6,542,930 | B1* | 4/2003 | Auvenshine | G06F 16/10 709/224 |
| 7,774,782 | B1* | 8/2010 | Popescu | H04L 67/02 718/104 |
| 2003/0177176 | A1* | 9/2003 | Hirschfeld | H04L 69/329 709/203 |
| 2006/0168217 | A1* | 7/2006 | Anand | H04L 67/32 709/225 |
| 2012/0259983 | A1* | 10/2012 | Nakadai | G06F 9/5083 709/226 |
| 2012/0290714 | A1* | 11/2012 | Cohen | G06F 11/3055 709/224 |
| 2014/0006350 | A1 | 1/2014 | Fukui et al. | |
| 2015/0020167 | A1* | 1/2015 | Yu | H04L 63/08 726/4 |
| 2018/0020048 | A1* | 1/2018 | Seol | H04L 67/1029 |
| 2019/0188315 | A1* | 6/2019 | Hsieh | G06F 16/24568 |

FOREIGN PATENT DOCUMENTS

JP   2013-222221 A   10/2013
JP   2014-010465 A   1/2014

* cited by examiner

*Primary Examiner* — Raymond N Phan
(74) *Attorney, Agent, or Firm* — Fujitsu Patent Center

(57) ABSTRACT

An information processing device includes a memory and circuitry coupled to the memory and configured to determine, when execution of a process on data is canceled in accordance with a cancellation request from a source that has requested the process, whether the process is to be executed and whether a result of executing the process is to be stored, based on a processing rate of the process by the information processing device.

12 Claims, 20 Drawing Sheets

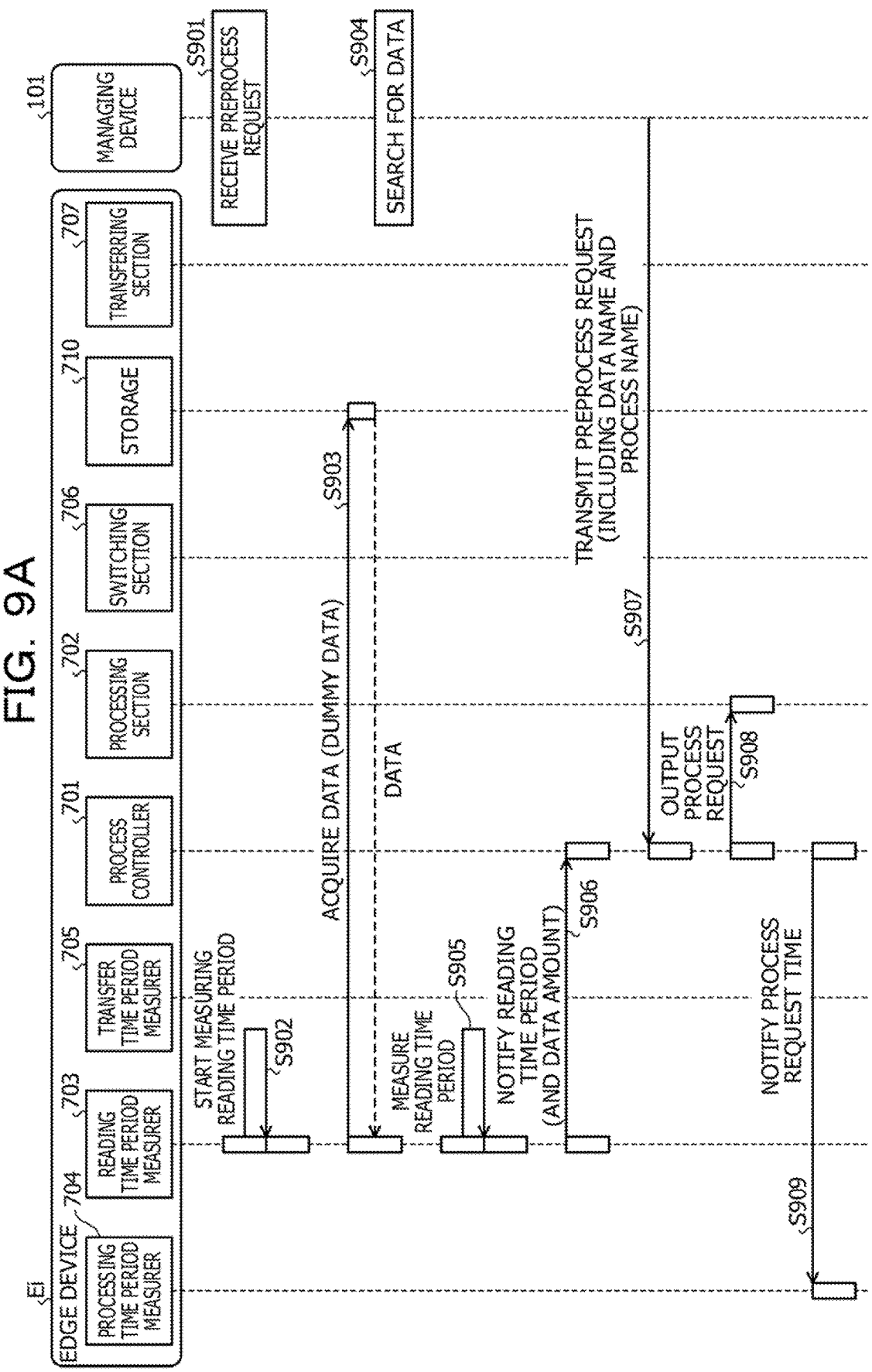

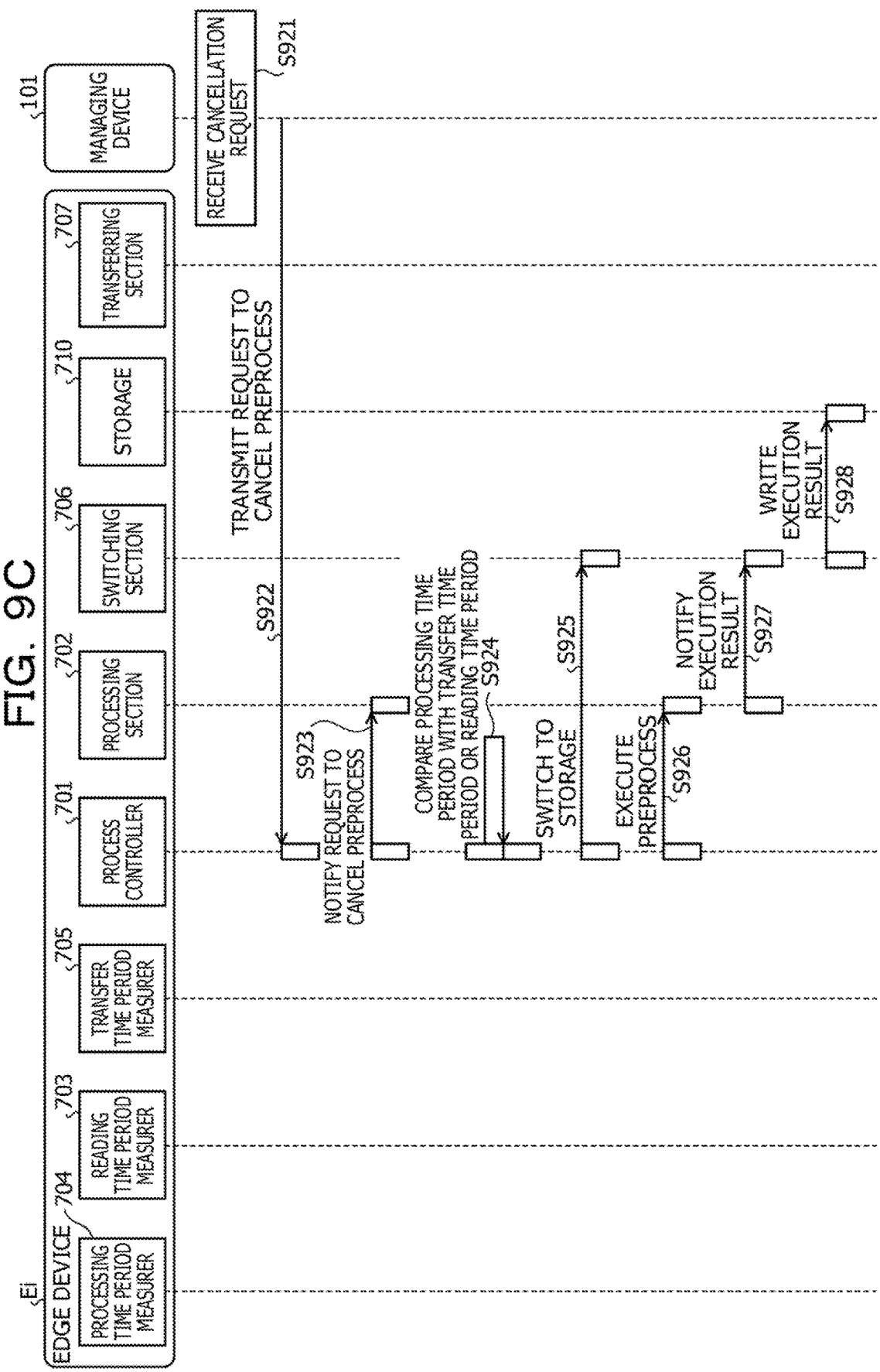

DATA PROCESS EXECUTION DEVICE, STORAGE MEDIUM, AND DATA PROCESS EXECUTION SYSTEM

CROSS-REFERENCE TO RELATED APPLICATION

This application is based upon and claims the benefit of priority of the prior Japanese Patent Application No. 2018-237392, filed on Dec. 19, 2018, the entire contents of which are incorporated herein by reference.

FIELD

The embodiments discussed herein are related to an information processing device, a storage medium storing an information processing program, and an information processing system.

BACKGROUND

In recent years, a system has been developed, which enables a user of data distributed and accumulated in a cloud and an edge device (edge server) to easily perform cumbersome preprocesses, such as a process of searching for a data location, data formation, and filtering, in order to concentrate on data analysis. In the system, the preprocesses are executed by the edge device on data, and the data subjected to the preprocesses is collected in the cloud and analyzed.

As a related technique, a managing server exists, which sets a priority of a data migration process to be higher than a priority of a data access process when an average load of a migration source server or a migration destination server is equal to or higher than a high-load threshold, and sets the priority of the data access process to be higher than the priority of the data migration process when the average load of the migration source server or the migration destination server is equal to or lower than a middle-to-low load threshold. Another technique exists, which references an attribute of a real file, an attribute of a context or virtual folder, and attributes of multiple storage clouds in response to the generation or storage of the real file in the virtual folder in a terminal used and selects one storage cloud for storing the real file so that a predetermined rule is satisfied.

As related art, Japanese Laid-open Patent Publication No. 2013-222221 and Japanese Laid-open Patent Publication No. 2014-010465 have been disclosed.

SUMMARY

According to an aspect of the embodiments, an information processing device includes a memory and circuitry coupled to the memory and configured to determine, when execution of a process on data is canceled in accordance with a cancellation request from a source that has requested the process, whether the process is to be executed and whether a result of executing the process is to be stored, based on a processing rate of the process by the information processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram illustrating examples of hardware configurations of the edge device and the like;

FIG. 9A is a first sequence diagram illustrating an example of operations of the information processing system;

FIG. 9C is a third sequence diagram illustrating the example of the operations of the information processing system;

DESCRIPTION OF EMBODIMENTS

It is difficult to improve the efficiency of executing a process on data accumulated in an edge device. For example, in data analysis, a user may perform a preprocess on data likely to be valid while referencing data accumulated in an edge device and repeatedly try to analyze the data while changing an analysis parameter or the like. In this case, when a result expected in the tried analysis is not obtained and the process is canceled and executed again, the same operation is repeated.

Under such circumstances, it is desirable to improve the efficiency of executing a process on data.

According to an aspect of the present disclosure, the efficiency of executing a process on data may be improved.

Hereinafter, embodiments of an information processing device disclosed herein, an information processing program disclosed herein, and an information processing system disclosed herein are described with reference to the accompanying drawings.

First Embodiment

First, an example of a configuration of an information processing system 100 according to a first embodiment is described below. The information processing system 100 is applied to a distributed processing environment enabled by edge computing.

Figure 1:
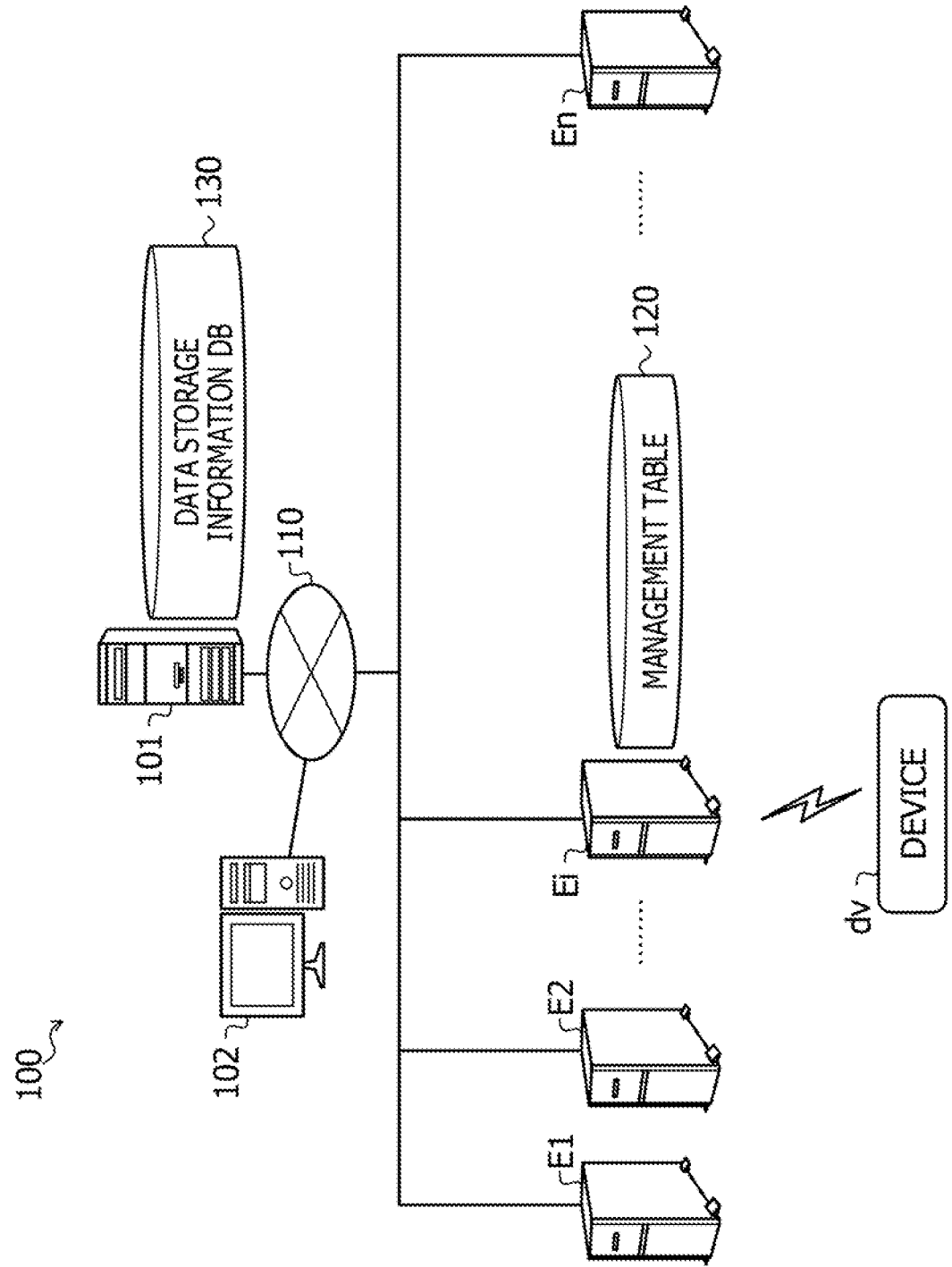
FIG. 1 is an explanatory diagram illustrating an example of a configuration of an information processing system.

FIG. 1 is an explanatory diagram illustrating an example of a configuration of the information processing system 100. In FIG. 1, the information processing system 100 includes edge devices E1 to En (n is a natural number of 2 or more), a managing device 101, and a client device 102. In the information processing system 100, the edge devices E1 to En, the managing device 101, and the client device 102 are coupled to each other via a wired or wireless network 110. The network 110 is, for example, a local area network (LAN), a wide area network (WAN), the Internet, or the like.

In the following description, an arbitrary edge device among the edge devices E1 to En is referred to as "edge device Ei" (i=1, 2, . . . , n) in some cases.

The edge device Ei is an information processing device (computer) that executes a process. For example, the edge device Ei is a server, a gateway device, an access point, a personal computer (PC), or the like. The process is, for example, a process to be executed on data transmitted from a device dv.

The device dv is, for example, a vehicle sensor, a device sensor, an environment sensor, a camera, or the like. The data transmitted from the device dv is sensing data of the various sensors, an image captured by the camera, or the like. The process to be executed on the data is, for example, a preprocess of executing an analysis process or the like. Examples of the preprocess are a process of calculating an average value of the sensing data and a process of extracting characteristic amounts of an image.

The edge device Ei includes a management table 120. The management table 120 stores management information on a process that is executed by the edge device Ei. Details stored in the management table 120 will be described below with reference to FIG. 5. In the following description, the process that is executed by the edge device Ei is referred to as "process Pi" in some cases.

The managing device 101 is an information processing device (computer) that requests the edge device Ei to execute the process PI. For example, the managing device 101 is a cloud computing server. The managing device 101 includes a data storage information database (DB) 130. The data storage information DB 130 stores information indicating a location at which data to be processed is stored. The data to be processed is, for example, the data transmitted from the device dv. Based on the data storage information DB 130, data and an edge device storing the data may be identified.

The client device 102 is a computer that is used by a user of the information processing system 100. The user uses the information processing system 100 to request a preprocess, analyze data obtained in the preprocess, or the like. For example, the client device 102 is a PC, a tablet PC, a smartphone, or the like.

For example, in data analysis, the user may perform a preprocess on data, which is likely to be valid among data accumulated in an edge device (for example, the edge device Ei), and repeatedly try to analyze the data while changing an analysis parameter or the like. In this case, when a result expected in the tried analysis is not obtained and the process is canceled and executed again, the same operation is repeated. For example, when a specification of the edge device is low, a load may frequently increase and latency may increase.

Thus, it is considered that, when a process starts to be executed by each of the edge devices and is canceled, the process is continuously executed by each of the edge devices and data subjected to the preprocess is stored for a request to execute the process next. However, when data tried to be analyzed is stored for each try, a storage resource may quickly become insufficient.

To inhibit the insufficiency of the storage resource, it is considered to determine a rule of deleting data stored for a time period longer than a time period defined in advance or a rule of rewriting data in order from the oldest data. However, when a time period to the deletion of the data is not appropriately set, a request to execute the process may be provided again after the deletion and a pointless process may be executed.

For example, in the case where it takes time to read stored data and transfer the data to a cloud, even when data subjected to a preprocess is stored, a total time period (taken to execute the preprocess and the transfer) may slightly decrease or may increase. Thus, there is no advantage of storing the data subjected to the preprocess.

The first embodiment describes the information processing system 100 that may improve the efficiency of executing a process on data accumulated in the edge device Ei. For example, when the execution of the process Pi by the edge device Ei on data is canceled in accordance with a cancellation request from a source that has requested the process Pi, the edge device Ei determines, based on a processing rate of the process Pi by the edge device Ei, whether the process Pi is to be executed and whether a result of executing the process Pi is to be stored.

The source that has requested the process Pi is, for example, the managing device 101. For example, when a result expected in tried analysis is not obtained, the request to cancel the process Pi is provided in accordance with an instruction from the user of the information processing system 100. The processing rate of the process Pi is an index value indicating the rate at which the process Pi is progressed. For example, the processing rate of the process Pi is indicated by the amount of data to be processed per unit of time.

For example, for a request to be provided to execute the same process as the canceled process Pi, the edge device Ei determines whether the process Pi is to be executed in advance and whether the result of executing the process Pi is to be stored in advance. The edge device Ei may restart and continuously execute the canceled process Pi (or take over an intermediate result of executing the process Pi canceled in the middle of the process Pi) from the state in which the process Pi is canceled. Alternatively, the edge device Ei may executes the canceled process Pi again (from the beginning of the process Pi).

In the execution of the process Pi, when the length of time it takes to read stored data (data to be processed) is longer than the length of time it takes to process the data, the reading of the data is a bottleneck and an advantage of executing the process Pi and storing the result of executing the process Pi in advance is small. Thus, the edge device Ei may determine whether the canceled process Pi is to be executed and whether the result of executing the process Pi is to be stored, based on the processing rate of the process Pi and the rate of the reading of the data from storage (for example, storage 710 illustrated in FIG. 7 described later) storing the data to be processed, for example.

When the length of time it takes to transfer the execution result to the source that has requested the process Pi is longer than the length of time it takes to process the data, the transfer of the data is a bottleneck and an advantage of executing the process Pi and storing the result of executing the process Pi in advance is small. Thus, the edge device Ei may determine whether the canceled process Pi is to be executed and whether the result of executing the process Pi is to be stored, based on the processing rate of the process Pi and the rate of the transfer of the result of executing the process Pi to the source that has requested the process Pi.

A specific example of the process to be executed by the edge device Ei is described with reference to FIG. 2.

Figure 2:
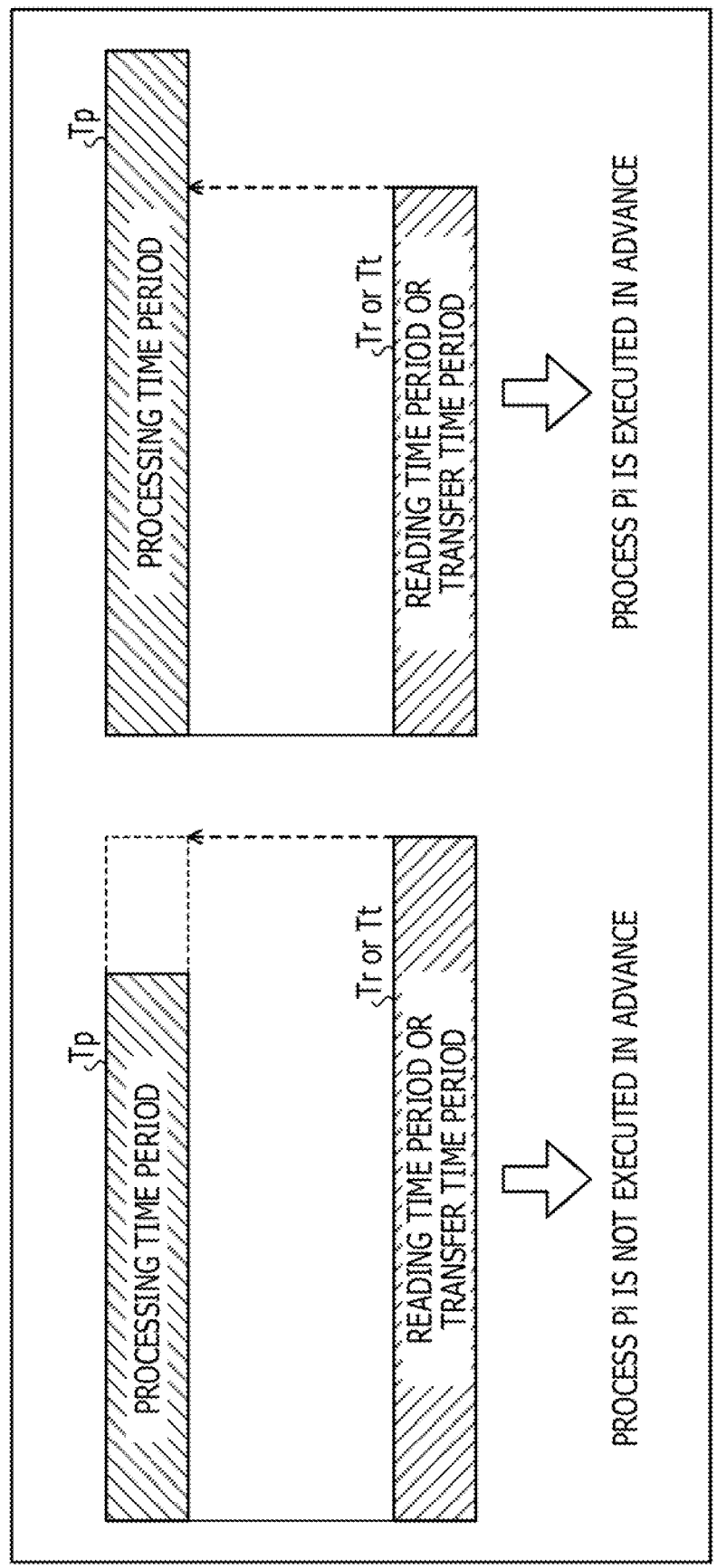
FIG. 2 is an explanatory diagram illustrating relationships between a processing time period and a reading time period or a transfer time period.

FIG. 2 is an explanatory diagram illustrating relationships between a processing time period and a reading time period or a transfer time period. For example, the edge device Ei compares a processing time period Tp with a reading time period Tr or a transfer time period Tt. The processing time period Tp is the length of time it takes to execute the process Pi on the data. For example, the processing time period Tp is calculated from the processing rate of the processing Pi and the amount of the data to be processed.

The reading time period Tr is the length of time it takes to read the data from the storage storing the data to be processed. For example, the reading time period Tr is calculated from the data reading rate and the amount of the data to be processed. For example, the data reading rate is indicated by the amount of data to be read per unit of time.

The transfer time period Tt is the length of time it takes to transfer the result of executing the process Pi to the source that has requested the process Pi. For example, the transfer time period Tt is calculated from the data transfer rate and a data amount of the result of executing the process Pi. For example, the data transfer rate is indicated by the amount of data to be transferred per unit of time.

For example, when the processing time period Tp is equal to or shorter than the reading time period Tr and equal to or shorter than the transfer time period Tt, the execution of the process Pi is unlikely to be a bottleneck, and thus the edge device Ei determines that the canceled process Pi is not to be executed and that the result of executing the process Pi is not to be stored (refer to the left side of FIG. 2). On the other hand, when the processing time period Tp is longer than the reading time period Tr or longer than the transfer time period Tt, the execution of the process Pi is likely to be a bottleneck, and thus the edge device Ei determines that the canceled process Pi is to be executed and that the result of executing the process Pi is to be stored (refer to the right side of FIG. 2).

Thus, only when it is estimated that a time period from the start of the process Pi to the transfer of a result of executing the process Pi is reduced compared with the case where the process Pi is executed when a request to execute the process next or later is provided, the process Pi may be executed in advance and the result of executing the process Pi may be stored in advance. In other words, it may be possible to inhibit the process Pi from being executed in advance and inhibit a pointless process, such as the storing of the result of executing the process Pi, from being executed in advance, regardless of the fact that it is not estimated that the time period from the start of the process Pi to the transfer of the result of executing the process Pi is reduced. When a process resource is available and the canceled process Pi is executed in the background, the process resource may be efficiently used.

In the above description, the edge device Ei determines whether the canceled process Pi is to be executed and whether the result of executing the process Pi is to be stored. The determination, however, is not limited to this. For example, when the execution of the process Pi by the edge device Ei is canceled, the managing device 101 may determine whether the process Pi is to be executed by the edge device Ei and whether the result of executing the process Pi is to be stored in the edge device Ei.

Figure 3:
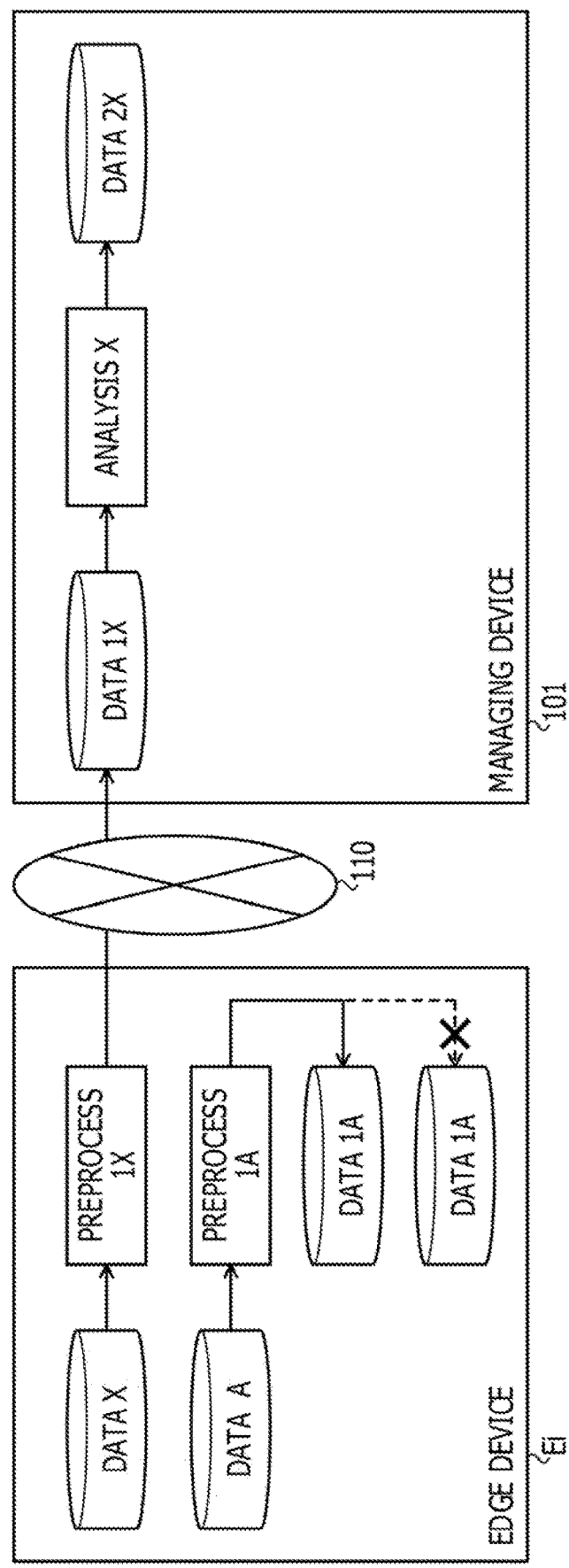
FIG. 3 is an explanatory diagram illustrating an example of operations of an edge device when execution of a process is canceled.

The following uses FIG. 3 to describe an example of operations of the edge device Ei when the execution of the process Pi is canceled in accordance with a cancellation request from the source that has requested the process Pi.

FIG. 3 is an explanatory diagram illustrating an example of operations of the edge device Ei when the execution of the process Pi is canceled. In the example, the data to be processed is "data A", the process Pi is a "preprocess 1A", and the result of executing the process Pi is "data 1A". The example assumes that the execution of the preprocess 1A by the edge device Ei is canceled in accordance with a cancellation request from the managing device 101. The managing device 101 is a source that has requested the preprocess 1A.

In this case, the edge device Ei determines whether the canceled preprocess 1A is to be executed and whether the result of executing the preprocess 1A is to be stored. For example, the edge device Ei calculates (estimates) a processing time period Tp of the preprocess 1A, a reading time period Tr of the data A, and a transfer time period Tt of the data 1A. In this case, the processing time period Tp of the preprocess 1A is the length of time it takes to process the preprocess 1A, the reading time period Tr of the data A is the length of time it takes to read the data A, and the transfer time period Tt of the data 1A is the length of time it takes to transfer the data 1A. Then, the edge device Ei compares the processing time period Tp of the preprocess 1A with the reading time period Tr of the data A. The edge device Ei also compares the processing time period Tp of the preprocess 1A with the transfer time period Tt of the data 1A.

When the processing time period Tp of the preprocess 1A is equal to or shorter than the reading time period Tr of the data A and equal to or shorter than the transfer time period Tt of the data 1A, the edge device Ei determines that the canceled preprocess 1A is not to be executed and that the result of executing the preprocess 1A is not to be stored. In this case, the canceled preprocess 1A is not executed and thus the data 1A that is the result of executing the preprocess 1A is not stored in the edge device Ei.

On the other hand, when the processing time period Tp of the preprocess 1A is longer than the reading time period Tr of the data A or longer than the transfer time period Tt of the data 1A, the edge device Ei determines that the canceled preprocess 1A is to be executed and that the result of executing the preprocess 1A is to be stored. In this case, the canceled preprocess 1A is executed and the data 1A that is the result of executing the preprocess 1A is stored in the edge device Ei.

This may suppress a time period to be taken when a request to execute the same process as the canceled preprocess 1A is provided again or a time period to the time when the data 1A (execution result) reaches the source that has requested the preprocess 1A. In the edge device Ei, the canceled preprocess 1A may be executed immediately when the edge device Ei determines that the canceled preprocess 1A is to be executed and that the result of executing the preprocess 1A is to be stored. Alternatively, in the edge device Ei, the canceled preprocess 1A may be executed within a time period during which the process resource is available.

In FIG. 3, a preprocess 1X is a process to be executed on data X requested by the managing device 101 to be processed by the edge device Ei. The preprocess 1X is executed by the edge device Ei without being canceled in the middle of the preprocess 1X, and the data 1X that is a result of executing the preprocess 1X is transmitted by the edge device Ei to the managing device 101. The managing device 101 executes analysis X on the data 1X and stores data 2X that is a result of the analysis X.

(Examples of Hardware Configurations of Edge Device Ei and Managing Device 101)

Next, examples of hardware configurations of the edge device Ei and the managing device 101 are described. The edge device Ei and the managing device 101 are referred to as "edge device Ei and the like" in some cases.

Figure 4:
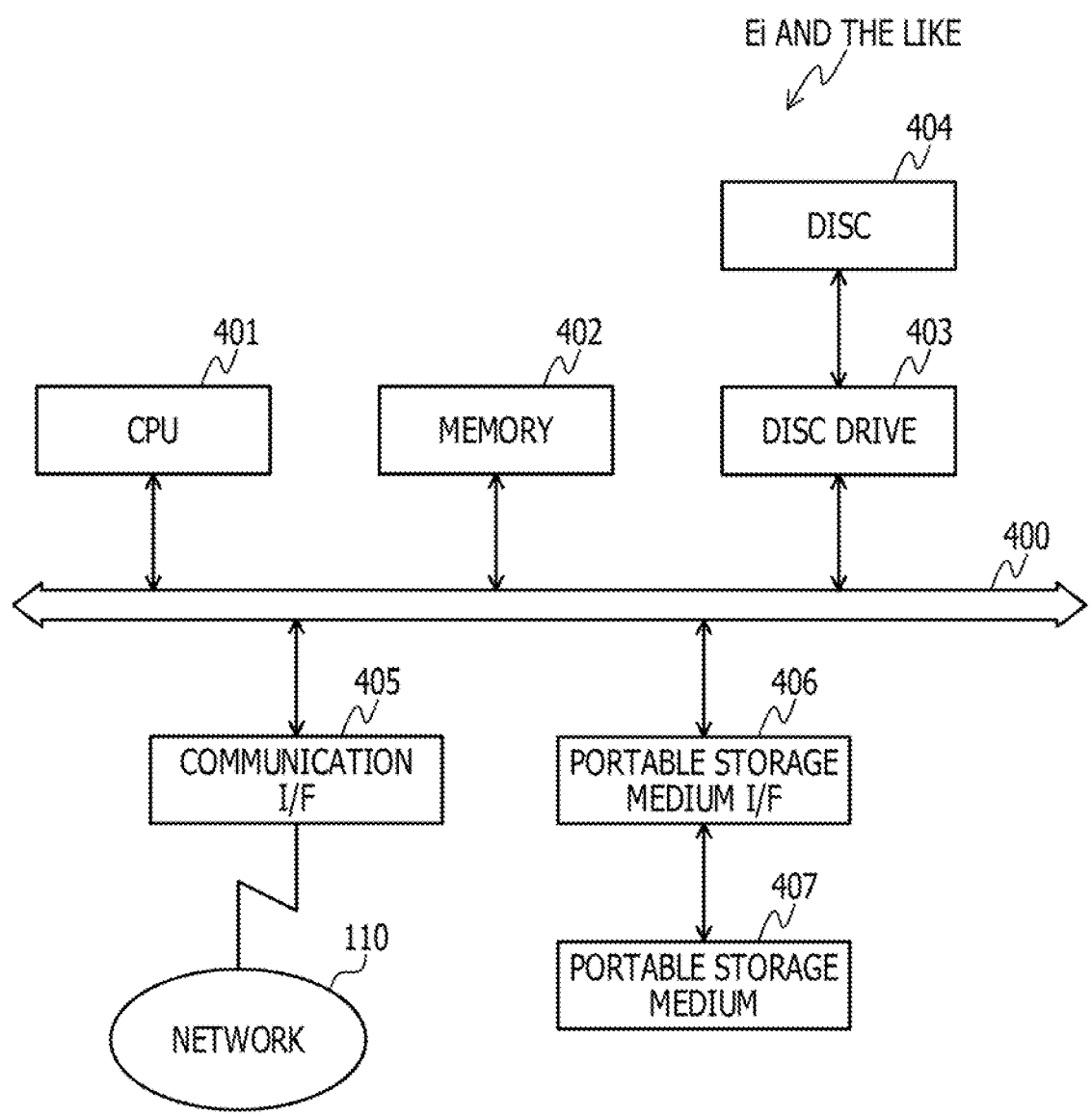

FIG. 4 is a block diagram illustrating the examples of the hardware configurations of the edge device Ei and the like. In FIG. 4, the edge device Ei includes a central processing unit (CPU) 401, a memory 402, a disc drive 403, a disc 404, a communication interface (I/F) 405, a portable storage medium I/F 406, and a portable storage medium 407. The constituent units 401, 402, 403, 405, and 406 are coupled to each other via a bus 400.

The CPU 401 controls the entire edge device Ei and the like. The CPU 401 may have multiple cores. The memory 402 includes, for example, a read-only memory (ROM), a random-access memory (RAM), a flash ROM, and the like. For example, the flash ROM stores an operating system (OS) program, the ROM stores an application program, and the RAM is used as a work area of the CPU 401. The programs stored in the memory 402 are loaded into the CPU 401 and cause the CPU 401 to execute a coded process.

The disc drive 403 controls reading and writing of data from and to the disc 404 in accordance with control by the CPU 401. The disc 404 stores data written under control by the disc drive 403. Examples of the disc 404 include a magnetic disk and an optical disc.

The communication I/F 405 is coupled to a network 110 via a communication line and coupled to an external computer via the network 110. The communication I/F 405 functions as an interface between the network 110 and the inside of the edge device Ei and controls input and output of data from and to the external computer. As the communication I/F 405, a modem, a LAN adapter, or the like may be used, for example.

The portable storage medium I/F 406 controls reading and writing of data from and to the portable storage medium 407 under control by the CPU 401. The portable storage medium 407 stores data written under control by the portable storage medium I/F 406. Examples of the portable storage medium 407 include a compact disc (CD)-ROM, a digital versatile disc (DVD), and a Universal Serial Bus (USB) memory.

Each of the edge device Ei and the like may include, for example, a solid state drive (SSD), an input device, a display, and the like, as well as the aforementioned constituent units. For example, each of the edge device Ei and the like may not include the disc drive 403, the disc 404, the portable storage medium I/F 406, and the portable storage medium 407 among the aforementioned constituent units. A hardware configuration of the client device 102 illustrated in FIG. 1 may be enabled by the same hardware configuration as those of the edge device Ei and the like. The client device 102, however, includes an input device, a display, and the like, as well as the aforementioned constituent units.

(Stored Details of Management Table 120)

Next, stored details of the management table 120 included in the edge device Ei are described. The management table 120 is enabled by a storage device, such as the memory 402, disc 404, or the like of the edge device Ei illustrated in FIG. 4.

Figure 5:
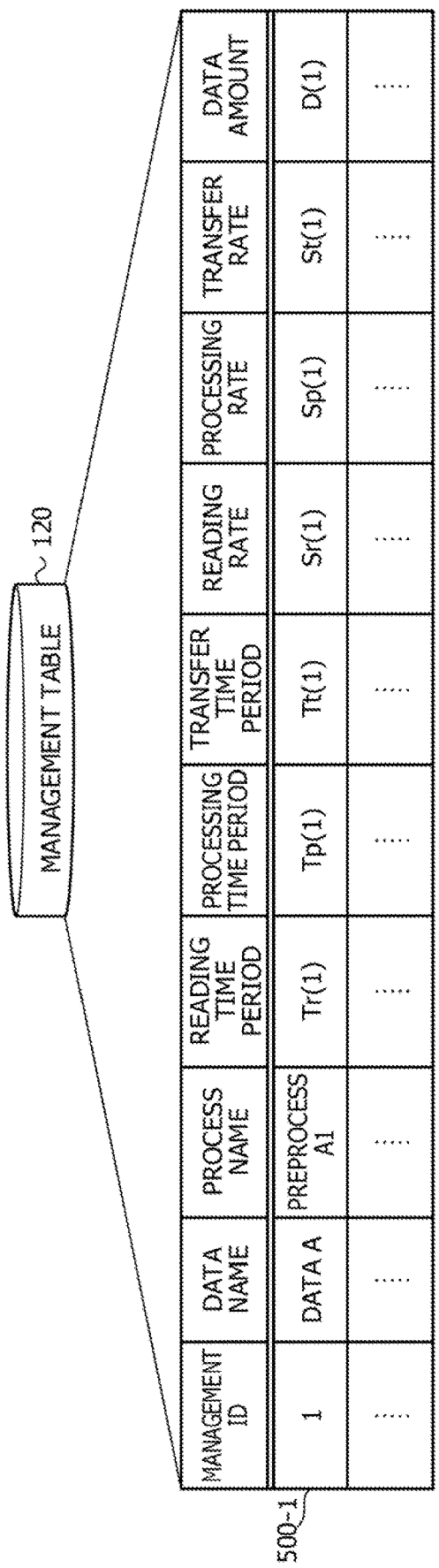
FIG. 5 is an explanatory diagram illustrating an example of stored details of a management table.

FIG. 5 is an explanatory diagram illustrating an example of the stored details of the management table 120. In FIG. 5, the management table 120 has fields for a management ID, a data name, a process name, a reading time period, a processing time period, a transfer time period, a reading rate, a processing rate, a transfer rate, and a data amount and stores, as a record, management information (for example, management information 500-1) by setting the information in the fields.

The management ID is an identifier uniquely identifying the record. The data name is the name of data to be processed. The data name is an example of tag information given to the data to be processed. The process name is the name of the process Pi to be executed on the data to be processed. The reading time period is the length of time it takes to read the data to be processed. The processing time period is the length of time it takes to execute the process Pi on the data to be processed. The transfer time period is the length of time it takes to transfer the result of executing the process Pi.

The reading rate is the amount of data to be read per unit of time. The reading rate is expressed in, for example, bytes per second. The processing rate is the amount of data to be processed per unit of time. The processing rate is expressed in, for example, bytes per second. The transfer rate is the amount of data to be transferred per unit of time. The transfer rate is expressed in, for example, bytes per second. The data amount is the amount of the data to be processed. The data amount is expressed in, for example, bytes.

(Example of Functional Configuration of Managing Device 101)

Next, an example of a functional configuration of the managing device 101 is described.

Figure 6:
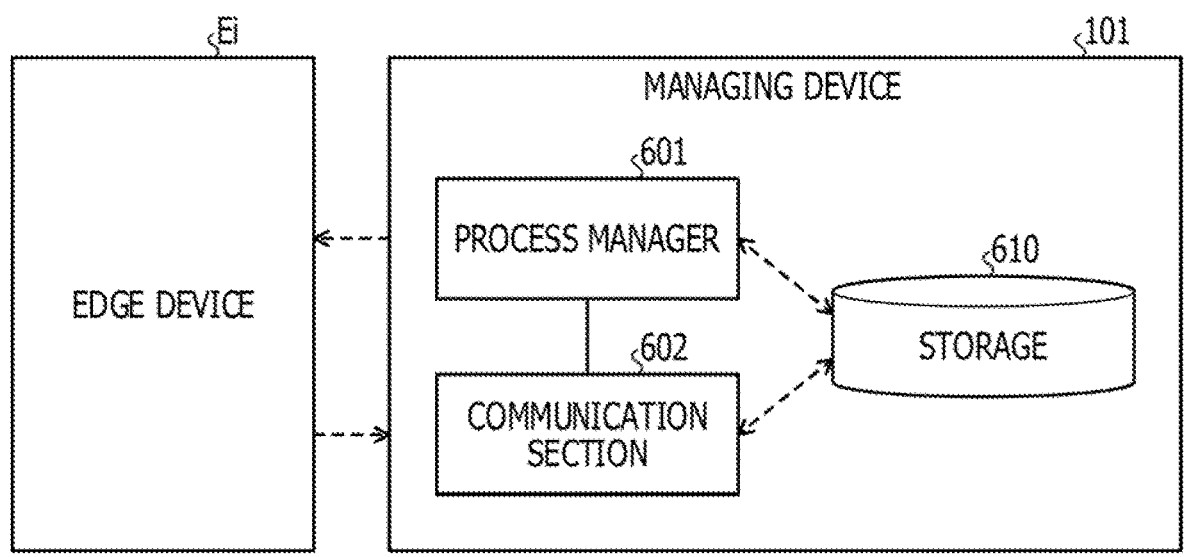
FIG. 6 is a block diagram illustrating an example of a functional configuration of a managing device.

FIG. 6 is a block diagram illustrating the example of the functional configuration of the managing device 101. In FIG. 6, the managing device 101 includes a process manager 601 and a communication section 602. For example, functions of the process manager 601 and the communication section 602 are enabled by causing the CPU 401 to execute a program stored in a storage device, such as the memory 402 or disc 404 of the managing device 101 illustrated in FIG. 4, or are enabled by the communication I/F 405. Processing results of the functional sections are stored, for example, in a storage device, such as the memory 402, disc 404, or the like of the managing device 101.

The process manager 601 receives a process request. The process request is a request to execute the process on the data. The process request includes, for example, Information identifying the data and the corresponding process (for example, a preprocess). For example, the process request includes the name of the data to be processed and the name of the process to be executed on the data to be processed. The process to be executed on the data to be processed is, for example, a preprocess of executing the analysis process or the like.

For example, the process manager 601 receives the process request from an external application and accepts the received process request. The external application is executed in a calculator coupled to the managing device 101 or the network 110 and requests the preprocess and analyzes data obtained by the preprocess in accordance with an instruction from the client device 102 illustrated in FIG. 1.

The process manager 601 receives the process request and instructs the edge device Ei to execute the process Pi in response to the reception of the process request. For example, the process manager 601 references a data storage information DB 130 (refer to FIG. 1) and identifies the edge device Ei storing the data identified from the received process request. Then, the process manager 601 transmits, to the identified edge device Ei, a request to execute the process Pi identified from the received process request.

The request to execute the process Pi includes information identifying the data to be processed and details of the process Pi. For example, the request to execute the process Pi includes the name of the data to be processed and the name of the process Pi.

In the information processing system 100, the tag information is given to the data to be processed. The tag information identifies the data to be processed and is, for example, the name of the data, the type of the data, and the like. It is assumed that the tag information given to the data to be processed is synchronized between the managing device 101 and the edge device Ei.

The communication section 602 receives a result of executing the process Pi from the edge device Ei. When the process Pi is a preprocess to be executed on the data to be processed, the result of executing the process Pi is data obtained by the preprocess. In the edge device Ei, the process PI that is executed on the data to be processed is executed for each of data items into which the data to be processed is divided by a predetermined data unit. In this case, every time the process Pi is completely executed on each of the divided data items in the edge device Ei, the communication section 602 receives a result of executing the process Pi on the data item.

The received result of executing the process Pi on the data is stored in, for example, storage 610. For example, the communication section 602 associates the result of executing the process Pi with the name (tag information) of the data to be processed and the name of the process Pi and causes the result of executing the process Pi to be stored in the storage 610. The results of executing the process Pi may be associated with information identifying the edge device Ei. The storage 610 is enabled by the disc 404 of the managing device 101, for example. The storage 610 is, for example, a hard disk drive (HDD), an SSD, or the like.

The process manager 601 receives a cancellation request. The cancellation request is a request to cancel the process being executed in accordance with the process request. The cancellation request includes information identifying the process being executed, for example. For example, the cancellation request includes the name of data to be processed and the name of the process executed on the data to be processed.

The process manager 601 receives the cancellation request and instructs the edge device Ei to cancel the process Pi in response to the reception of the cancellation request. For example, the process manager 601 identifies the edge device Ei executing the process Pi identified from the received cancellation request. The process manager 601 transmits, to the identified edge device Ei, a request to cancel the process Pi identified from the received cancellation request.

The request to cancel the process Pi includes the information identifying the process Pi being executed, for example. For example, the request to cancel the process Pi includes the name of the data to be processed and the name of the process Pi.

The process manager 601 outputs the result of executing the process requested. For example, the process manager 601 outputs the result, stored in the storage 610, of executing the process Pi. For example, as a method of outputting the result from the process manager 601, the process manager 601 outputs the execution result to the external application, the communication I/F 405 of the managing device 101 transmits the execution result to another computer, or the like.

For example, the result, output to the external application, of executing the process Pi may be referenced by a user of the client device 102 and used in the analysis process.

(Example of Functional Configuration of Edge Device Ei)

Figure 7:
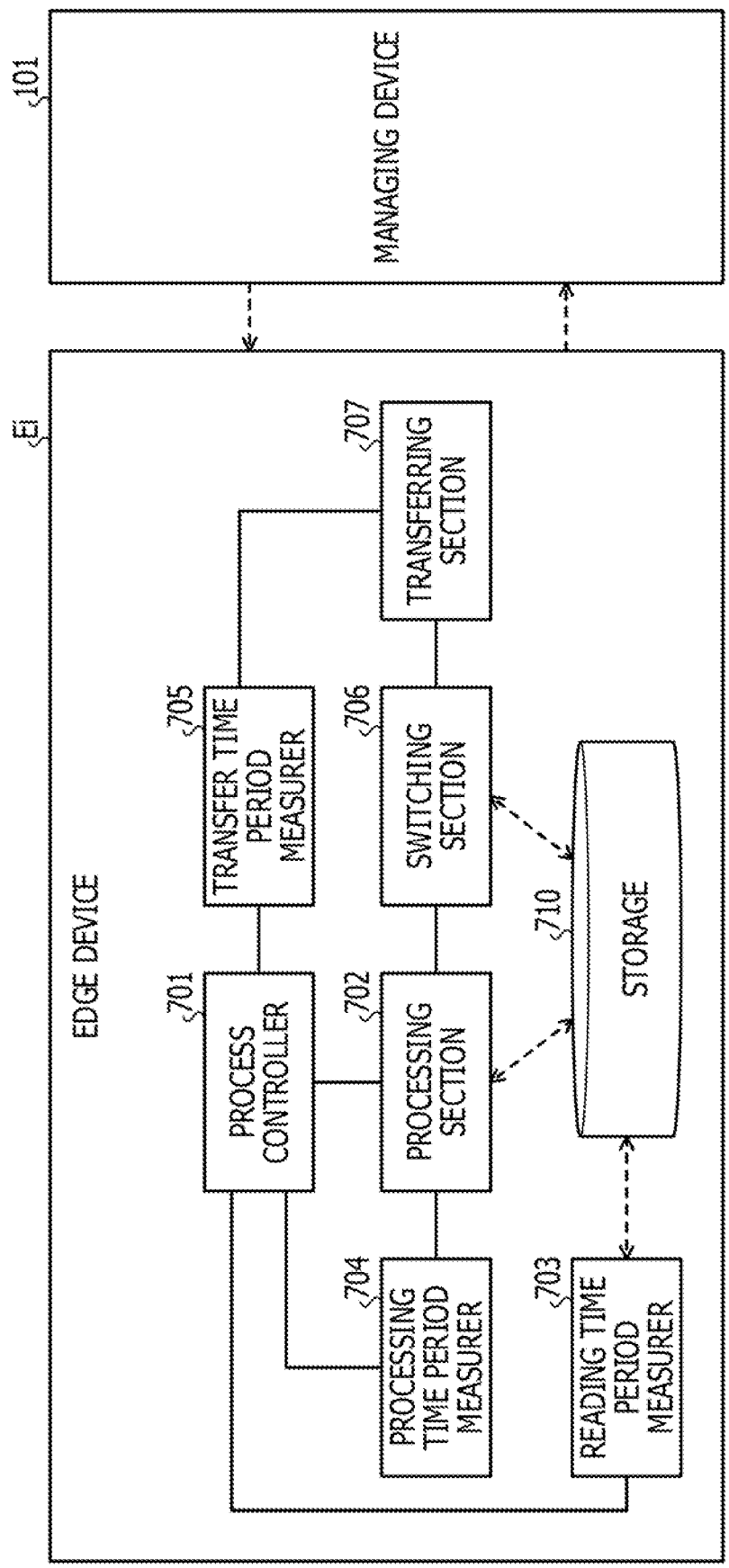
FIG. 7 is a block diagram illustrating an example of a functional configuration of the edge device.

FIG. 7 is a block diagram illustrating an example of a functional configuration of the edge device Ei. In FIG. 7, the edge device Ei includes a process controller 701, a processing section 702, a reading time period measurer 703, a processing time period measurer 704, a transfer time period measurer 705, a switching section 706, and a transferring section 707. For example, functions of the functional section 701 to the transferring section 707 are enabled by causing the CPU 401 to execute a program stored in a storage device, such as the memory 402, disc 404, or the like of the edge device Ei illustrated in FIG. 4, or are enabled by the communication I/F 405. Process results of the functional sections are stored in, for example, the storage device, such as the memory 402, disc 404, or the like of the edge device Ei.

The process controller 701 receives the request to execute the process Pi. When the process controller 701 receives the request to execute the process Pi, the process controller 701 causes the processing section 702 to execute the process Pi. The request to execute the process Pi Includes, for example, the information (including the name of data and the name of the process) identifying the data to be processed and details of the process Pi.

For example, the process controller 701 receives the request to execute the process Pi from the managing device 101 and accepts the received request to execute the process P1. Upon accepting the received request to execute the process Pi, the process controller 701 outputs the request to execute the process Pi to the processing section 702.

The processing section 702 executes the process Pi in accordance with the request, received from the process controller 701, to execute the process Pi. For example, the processing section 702 acquires, from the storage 710, the data to be processed and identified from the request to execute the process Pi. The storage 710 is a storage section storing the data to be processed. The storage 710 is, for example, enabled by the disc 404 of the edge device Ei. The storage 710 is, for example, an HDD, an SSD, or the like.

The data to be processed is sensing data transmitted by the device dv, a captured image transmitted by the device dv, or the like. The tag information including the name of the data and the type of the data is given to the data to be processed. Hereinafter, the data to be processed is referred to as "target data" in some cases.

For example, the processing section 702 acquires, as the target data, the data corresponding to the data name included in the request to execute the process Pi from the storage 710. Then, the processing section 702 starts to execute the process Pi on the acquired target data. Details of the process Pi are identified from the process name included in the request to execute the process Pi.

The process Pi to be executed on the target data is executed for each of the data items into which all the target data is divided by the predetermined data unit. In the following description, the data items into which all the target data is divided by the predetermined data unit are referred to as "divided data items" in some cases. The number of data items into which the target data is divided is referred to as "N" in some cases.

For example, the processing section 702 acquires the data items obtained by dividing the target data from the storage 710. The processing section 702 executes the process Pi on the divided data items. The processing section 702 sequentially executes the process Pi on the divided data items until the process Pi is completely executed on all the divided data items.

The result of executing the process Pi on the target data is output to the switching section 706 and output from the switching section 706 to the transferring section 707 or the storage 710. For example, every time the process Pi is completely executed on each of the divided data items obtained by dividing the target data, a result of executing the process Pi on the divided data item is output to the switching section 706.

A destination to which the result of executing the process Pi on the target data in accordance with the request from the source that has requested the process Pi is transferred is the source that has requested the process Pi. Thus, the switching section 706 outputs the result of executing the process Pi to the transferring section 707. The transferring section 707 transfers the result of executing the process Pi to the source that has requested the process Pi. On the other hand, when the process controller 701 determines that the canceled process Pi is to be executed, the switching section 706 switches an output destination of the result of executing the process Pi from the transferring section 707 to the storage 710.

The process controller 701 receives a request to cancel the process Pi. The request to cancel the process Pi is a request to cancel the process Pi being executed. The request to cancel the process Pi includes the information identifying the process Pi being executed, for example. For example, the request to cancel the process Pi includes the name of the data to be processed and the name of the process executed on the data to be processed. For example, the process controller 701 receives the request to cancel the process Pi from the managing device 101 and accepts the received request to cancel the process Pi in response to the reception of the request to cancel the process Pi.

Upon accepting the request to cancel the process Pi, the process controller 701 cancels the execution of the process Pi by the processing section 702. For example, the process controller 701 notifies the request to cancel the process Pi to the processing section 702. Thus, the processing section 702 may cancel the execution of the process Pi in accordance with the request, received from the source that has requested the process Pi, to cancel the process Pi.

The reading time period measurer 703 measures a data reading time period. The data reading time period is the length of time it takes to read data. For example, the reading time period measurer 703 reads dummy data from the storage 710. In this case, the reading time period measurer 703 measures the data reading time period from the start of the reading of the dummy data to the completion of the reading of the dummy data.

It is, therefore, possible to obtain the data reading time period taken to read the dummy data. The dummy data is data to be used to calculate the data reading time period. As the dummy data, any data stored in the storage 710 may be used. The measured data reading time period and the amount of the dummy data are notified to the process controller 701.

The processing time period measurer 704 measures a data processing time period. The data processing time period is the length of time it takes to execute the process Pi on the data. For example, the processing time period measurer 704 measures, as the data processing time period, the length of time it takes to execute the process Pi on the divided data items obtained by dividing the target data.

It is, therefore, possible to obtain the data processing time period taken to execute the process Pi on the divided data items. The measured data processing time period and amounts of the divided data items are notified to the process controller 701, for example.

The transfer time period measurer 705 measures a data transfer time period. The data transfer time period is the length of time it takes to transfer the data. For example, the transfer time period measurer 705 measures the data transfer time period from the start of the transfer of the results of executing the process Pi on the divided data items obtained by dividing the target data to the completion of the transfer of the results to the managing device 101 that is the source that has requested the process Pi.

It is, therefore, possible to obtain the data transfer time period taken to transfer the results of executing the process Pi on the divided data items obtained by dividing the target data to the source that has requested the process Pi. The measured data transfer time period and data amounts of the results of executing the process Pi on the divided data items are notified to the process controller 701.

The process controller 701 calculates a rate Sr of the reading of the target data from the storage 710. The reading rate Sr is the amount of data to be read per unit of time. For example, the process controller 701 calculates the reading rate Sr by dividing the amount, notified by the reading time period measurer 703, of the dummy data by the data reading time period notified by the reading time period measurer 703.

The process controller 701 calculates a processing rate Sp of the process Pi by the edge device Ei. The processing rate Sp is the amount of data to be processed per unit of time. For example, the process controller 701 calculates the processing rate Sp by dividing the total of the amounts, notified by the processing time period measurer 704, of the divided data items by the data processing time period notified by the processing time period measurer 704.

The processing time period measurer 704 may notify the amounts of the multiple divided data items and the data processing time to the process controller 701. In this case, the process controller 701 may calculate, as the processing rate Sp, an average value of calculated processing rates of the process Pi executed on the multiple divided data items.

The process controller 701 calculates a rate St of the transfer of the result of executing the process Pi to the source that has requested the process Pi. The transfer rate St is the amount of data to be transferred per unit of time. For example, the process controller 701 calculates the transfer rate St by dividing the total of the data amounts, notified by the transfer time period measurer 705, of the results of executing the process Pi on the divided data items by the data transfer time period notified by the transfer time period measurer 705.

The transfer time period measurer 705 may notify the data transfer time period and the data amounts of the results of executing the process Pi on the multiple divided data items to the process controller 701. In this case, the process controller 701 may calculate, as the transfer rate St, an average value of calculated transfer rates of the multiple divided data items.

The calculated reading rate Sr, the calculated processing rate Sp, and the calculated transfer rate St are associated with the name of the target data, the amount of the target data, and the name of the process Pi and stored in the management table 120 illustrated in FIG. 5.

When the execution of the process Pi is canceled in accordance with a cancellation request, the process controller 701 determines, based on the processing rate Sp of the process Pi by the edge device Ei, whether the canceled process Pi is to be executed and whether the result of executing the process Pi on the target data is to be stored. In this case, the canceled process Pi may restart to be continuously executed from the state in which the process Pi is canceled. Alternatively, the canceled process Pi may restart to be executed from the beginning of the process Pi.

For example, the process controller 701 may reference the management table 120 and determine, based on the processing rate Sp of the process Pi by the edge device Ei and the rate Sr of the reading of the target data from the storage 710, whether the canceled process Pi is to be executed and whether the result of executing the process Pi on the target data is to be stored.

For example, when the processing rate Sp is equal to or higher than the reading rate Sr, the process controller 701 determines that the canceled process Pi is not to be executed and that the result of executing the process Pi is not to be stored. On the other hand, when the processing rate Sp is lower than the reading rate Sr, the process controller 701 determines that the canceled process Pi is to be executed and that the result of executing the process Pi is to be stored.

The process controller 701 may compare the processing time period Tp with the reading time period Tr, instead of comparing the processing rate Sp with the reading rate Sr.

The reading time period Tr is the length of time it takes to read the target data from the storage 710. For example, the process controller 701 calculates the reading time period Tr by multiplying the reading rate Sr by the amount of the target data.

Thus, even when the execution of the process Pi on the target data is canceled in the middle of the process Pi, the reading time period Tr to be taken to read the target data from the storage 710 may be estimated from information obtained when the dummy data is read from the storage 710.

The processing time period Tp is the length of time it takes to execute the process Pi on the target data. For example, the processing time period Tp to be taken to execute the process Pi on the target data is calculated by multiplying the processing rate Sp by the amount of the target data.

Thus, even when the execution of the process Pi on the target data is canceled in the middle of the process Pi, the processing time period Tp to be taken to execute the process Pi on the target data may be estimated from information obtained when the process Pi is executed on the divided data items obtained by dividing the target data.

Then, when the processing time period Tp is equal to or shorter than the reading time period Tr, the process controller 701 determines that the canceled process Pi is not to be executed and that the result of executing the process Pi is not to be stored. On the other hand, when the processing time period Tp is longer than the reading time period Tr, the process controller 701 determines that the canceled process Pi is to be executed and that the result of executing the process Pi is to be stored. For example, when the processing time period Tp is equal to or longer than the reading time period Tr by a predetermined time period or more, the process controller 701 may determine that the canceled process Pi is to be executed and that the result of executing the process Pi is to be stored.

For example, the process controller 701 may reference the management table 120 and determine, based on the processing rate Sp of the process Pi by the edge device Ei and the rate St of the transfer of the result of executing the process Pi to the source that has requested the process Pi, whether the canceled process Pi is to be executed and whether the result of executing the process Pi is to be stored.

A data amount of a result of executing the process Pi on data to be processed may be different from the amount of the data to be processed. Thus, the process controller 701 may compare the processing time period Tp with the transfer time period Tt, instead of simply comparing the processing rate Sp with the transfer rate St.

The transfer time period Tt is the length of time it takes to transfer the result of executing the process Pi on the target data to the source that has requested the process Pi. For example, first, the process controller 701 calculates an average value (average data amount) of the data amounts, notified by the transfer time period measurer 705, of the results of executing the process Pi on the divided data items.

Next, the process controller 701 multiplies the calculated average data amount by the number N of divided data items obtained by dividing the target data, thereby estimating the data amount of the result of executing the process Pi on the target data. Then, the process controller 701 multiplies the transfer rate St by the estimated data amount, thereby calculating the transfer time period Tt to be taken to transfer the result of executing the process Pi on the target data.

Thus, even when the execution of the process Pi on the target data is canceled in the middle of the process PI, the transfer time period Tt to be taken to transfer the result of executing the process Pi on the target data may be estimated from information obtained when the results of executing the process Pi on the divided data items are transferred.

When the processing time period Tp is equal to or shorter than the transfer time period Tt, the process controller 701 determines that the canceled process Pi is not to be executed and that the result of executing the process Pi on the target data is not to be stored. On the other hand, when the processing time period Tp is longer than the transfer time period Tt, the process controller 701 determines that the canceled process Pi is to be executed and that the result of executing the process Pi is to be stored. For example, when the processing time period Tp is longer than the transfer time period Tt by a predetermined time period or more, the process controller 701 may determine that the canceled process Pi is to be executed and that the result of executing the process Pi is to be stored.

The calculated reading time period Tr, the calculated processing time period Tp, and the calculated transfer time period Tt are associated with, for example, the name of the target data, the amount of the target data, and the name of the process Pi and stored in the management table 120.

For example, when the processing rate Sp of the process Pi by the edge device Ei is lower than a threshold set in advance, the process controller 701 may determine that the canceled process Pi is to be executed and that the result of executing the process Pi is to be stored. On the other hand, when the processing rate Sp is equal to or higher than the threshold, the process controller 701 may determine that the canceled process Pi is not to be executed and that the result of executing the process Pi is not to be stored. The threshold may be set to an arbitrary value. For example, the threshold may be determined based on an average rate of the reading of data from storage of the same type as the storage 710, an average data transfer rate on the Internet, or the like.

When the process controller 701 determines that the canceled process Pi is to be executed and that the result of executing the process Pi is to be stored, the process controller 701 causes the processing section 702 to execute the canceled process Pi and causes the result of executing the process Pi to be stored in the storage 710. For example, the process controller 701 instructs the switching section 706 to switch the output destination of the result of executing the canceled process PI from the transferring section 707 to the storage 710. Then, the process controller 701 outputs a request to execute the canceled process Pi to the processing section 702.

As a result, the process Pi is executed by the processing section 702, and the result of executing the process Pi is written to the storage 710. For example, the processing section 702 associates the result of executing the process Pi on the target data with the information identifying the target data and the process Pi and writes the result of executing the process Pi on the target data to the storage 710 via the switching section 706.

Figure 8:
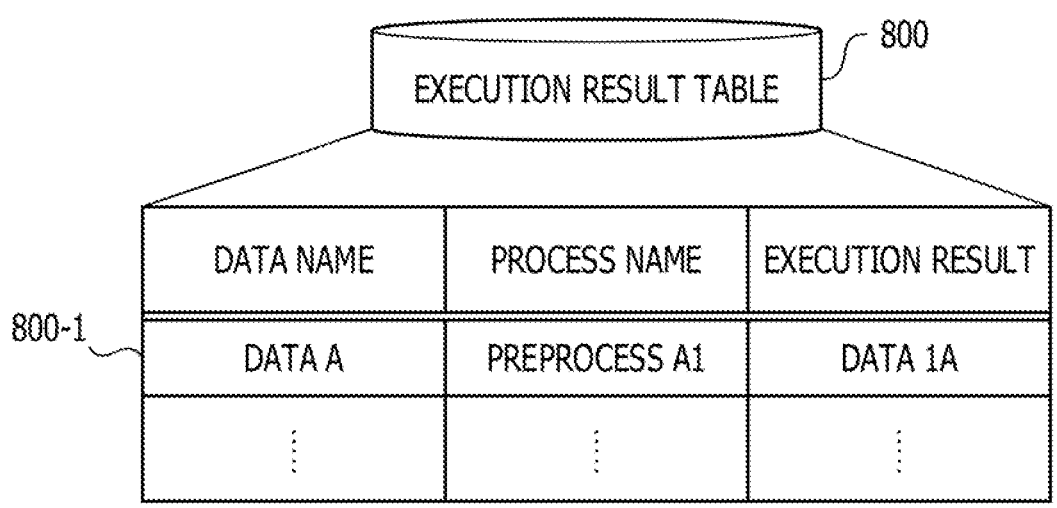
FIG. 8 is an explanatory diagram illustrating an example of stored details of an execution result table.

In the storage 710, the result of executing the process Pi on the target data is written to, for example, an execution result table 800 as illustrated in FIG. 8. Stored details of the execution result table 800 are described below.

FIG. 8 is an explanatory diagram illustrating an example of the stored details of the execution result table 800. In FIG. 8, the execution result table 800 includes fields for a data name, a process name, and an execution result and stores, as a record, execution result information (for example, execution result information 800-1) by setting the information in the fields.

The data name is the name of the target data. The process name is the name of the process Pi. The execution result indicates the result of executing the process Pi on the target data. In the example illustrated in FIG. 8, a data name of the result of executing the process Pi on the target data is indicated in the execution result field.

Thus, when a request to execute the same process as the canceled process Pi is provided, the execution result within the execution result table 800 may be used.

For example, upon receiving the request to execute the process Pi, the process controller 701 references the execution result table 800 and searches for the execution result information associated with a combination of the data name and the process name that are included in the request to execute the process Pi. When the execution result information is not found, the process controller 701 causes the processing section 702 to execute the process Pi.

On the other hand, when the execution result information is found, the process controller 701 causes the transferring section 707 to transfer the execution result included in the found execution result information to the source (managing device 101) that has requested the process Pi. Thus, when a request to execute the process Pi next or later is provided, it may be possible to reduce a time period to the transfer of a result of executing the process Pi to the source that has requested the process Pi.

The result, transferred to the requesting source (managing device 101), of executing the process Pi may be deleted from the storage 710 of the edge device Ei. Thus, it may be possible to inhibit insufficiency of an available capacity of the storage 710. A storage time period may be set in the result, stored in the storage 710, of executing the process Pi.

In this case, the edge device Ei may delete, from the storage 710, data stored for a time period longer than the storage time period.

The time when a request to execute the canceled process Pi is provided from the process controller 701 to the processing section 702 may be set to an arbitrary time. For example, the process controller 701 may output the request to execute the canceled process Pi to the processing section 702 when the process controller 701 determines that the canceled process Pi is to be executed and that the result of executing the process Pi is to be stored. In this case, the canceled process Pi is immediately executed and the result of executing the process Pi is stored in the storage 710 for a request to execute the process Pi next or later.

The process controller 701 may control, based on a usage status of the process resource, the time when the request to execute the canceled process Pi is output. For example, when the utilization of the CPU 401 is equal to or higher than a predetermined value β, the process controller 701 may hold the request to execute the canceled process Pi. When the utilization of the CPU 401 is lower than the predetermined value β, the process controller 701 may output the request to execute the canceled process Pi to the processing section 702. The predetermined value β may be set to an arbitrary value. For example, the predetermined value β may be set to a value in a range of 50% to 70% or the like.

In this case, when the CPU 401 is available, the process Pi may be executed in the background and the process resource may be effectively used. The execution of the canceled process Pi may inhibit a reduction in processing performance of the edge device Ei and enable requested performance from being secured.

When the canceled process Pi restarts to be continuously executed from the state in which the process Pi is canceled, it is preferable that the result of executing the process Pi before the cancellation be stored in the storage 710. Thus, the processing section 702 may cause an intermediate result (results of executing the process Pi on the divided data items) of executing the process Pi on the target data in the middle of the process Pi before the completion of the execution of the process Pi on the target data to be held in the memory 402 of the edge device Ei or the like.

Thus, when the canceled process Pi restarts to be executed, an intermediate execution result held in the memory 402 or the like in the middle of the process Pi may be stored in the storage 710 (execution result table 800). When the canceled process Pi restarts to be continuously executed from the state in which the process Pi is canceled, an intermediate result of executing the process Pi canceled in the middle of the process Pi is to be held and there is an advantage that the process canceled in the middle is not pointless.

The lifetime of the storage 710 that is determined based on amounts of data read and written, the numbers of times that reading and writing are able to be executed, and the like may be given to the storage 710. For example, when the storage 710 is an SSD, an upper limit of the number of times that data is able to be written is given to the storage 710. When the remaining number of times that data is able to be written to the storage 710 approaches the upper limit of the number of times that data is able to be written, it is not desirable that the storage 710 be used to store temporary data (result of executing the process Pi for a request to execute the process Pi next or later).

Thus, when the remaining number of times that data is able to be written to the storage 710 is equal to or smaller than the predetermined value α, the process controller 701 may determine that the canceled process Pi is not to be executed and that the result of executing the process Pi is not to be stored. The predetermined value α may be set to an arbitrary value. Thus, the result of executing the canceled process PI is not written to the storage 710, and it may be possible to inhibit the lifetime of the storage 710 from being reduced due to the writing of temporary data.

The functional sections of the edge device Ei may be enabled by the managing device 101. Alternatively, the functional sections of the edge device Ei may be enabled by multiple computers (for example, the managing device 101 and the edge device Ei) within the information processing system 100. For example, the process controller 701, which is among the functional sections of the edge device Ei, may be enabled by the managing device 101, and the other functional sections of the edge device Ei may be enabled by the edge device Ei. The managing device 101 collects, from the edge device Ei, information to be used to determine whether the canceled process Pi is to be executed by the edge device Ei and whether the result of executing the process Pi is to be stored in the edge device E. [0152] (Example of Operations of Information Processing System 100)

Figure 9B:
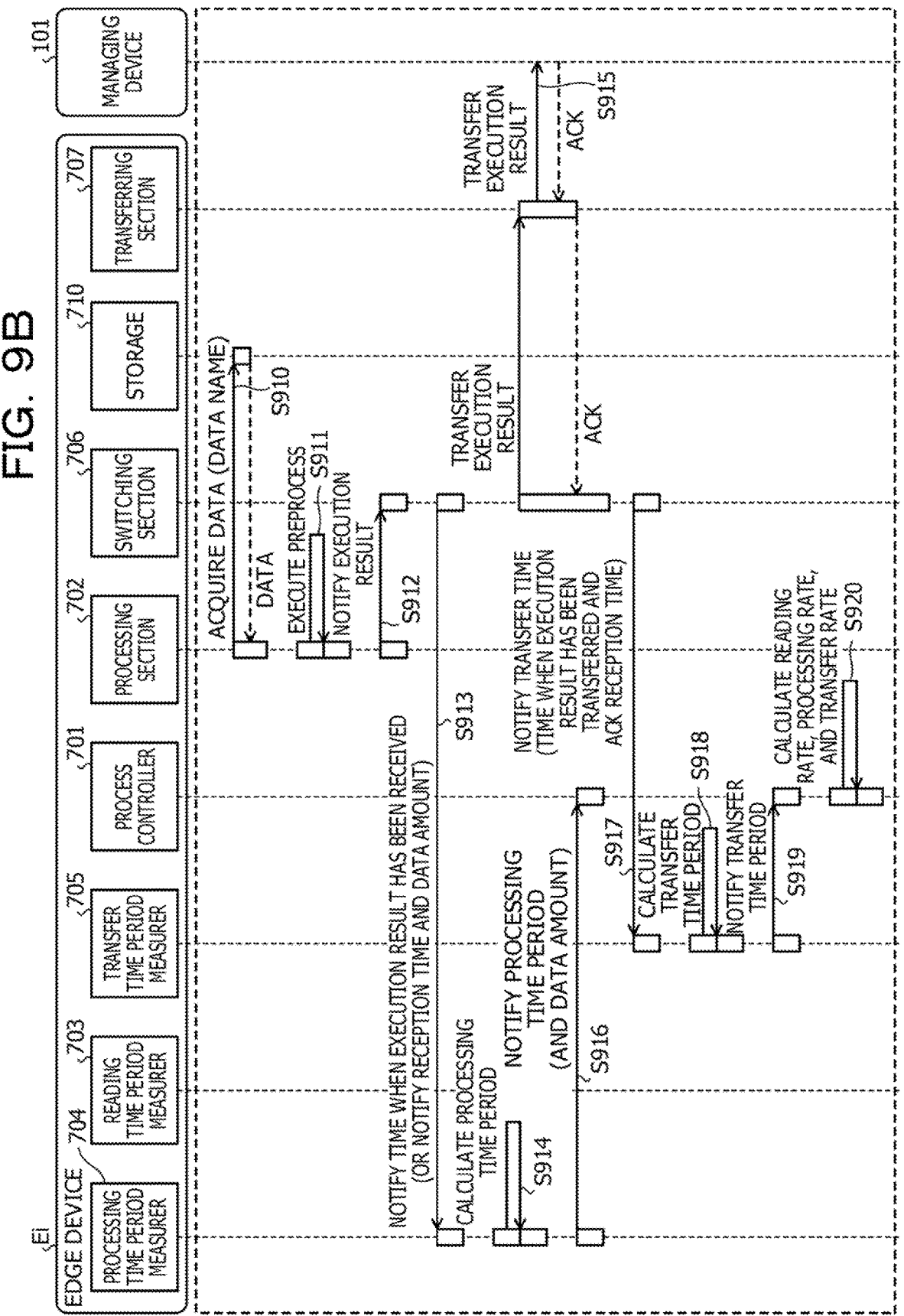
FIG. 9B is a second sequence diagram illustrating the example of the operations of the information processing system.

Next, an example of operations of the information processing system 100 is described with reference to FIGS. 9A, 9B, and 9C. In FIGS. 9A, 9B, and 9C, an illustration of the functional sections of the managing device 101 is omitted.

FIGS. 9A, 9B, and 9C are sequence diagrams illustrating the example of the operations of the information processing system 100. In the sequence diagram of FIG. 9A, first, the process manager 601 of the managing device 101 receives a preprocess request from the external application (in step S901).

The reading time period measurer 703 of the edge device Ei starts to measure a data reading time period (in step S902). Then, the reading time period measurer 703 of the edge device Ei reads the dummy data from the storage 710 (in step S903). The process manager 601 of the managing device 101 references the data storage information DB 130 (refer to FIG. 1) and searches for data identified from the received preprocess request (in step S904).

The reading time period measurer 703 of the edge device Ei measures the data reading time period after reading the dummy data (in step S905). Then, the reading time period measurer 703 of the edge device Ei notifies the measured data reading time period and the amount of the dummy data to the process controller 701 (in step S906).

Then, the process manager 601 of the managing device 101 transmits the preprocess request to the edge device Ei storing the data searched in step S904 (in step S907). The preprocess request corresponds to the request to execute the process Pi and includes the name of the data and the name of the process.

Upon receiving the preprocess request from the managing device 101, the process controller 701 of the edge device Ei outputs, to the processing section 702, a process request to execute a preprocess (corresponding to the process Pi) (in step S908). Then, the process controller 701 of the edge device Ei notifies a process request time to the processing time period measurer 704 of the edge device Ei (in step S909). The process request time is the time when the process request to execute the preprocess is output to the processing section 702.

In the sequence diagram of FIG. 9, the processing section 702 of the edge device Ei acquires, from the storage 710, the data corresponding to the data name included in the process request to execute the preprocess in accordance with the process request, received from the process controller 701, to execute the preprocess (in step S910). It is assumed that the preprocess is sequentially executed on each of divided data items obtained by dividing the target data. A series of processes surrounded by a dotted frame in FIG. 9B are executed on each of the divided data items obtained by dividing the target data.

Then, the processing section 702 of the edge device Ei executes the preprocess on the acquired data (in step S911). Next, the processing section 702 of the edge device Ei notifies a result of executing the preprocess on the data to the switching section 706 of the edge device Ei (in step S912).

Upon receiving the result of executing the preprocess, the switching section 706 of the edge device Ei notifies, to the processing time period measurer 704 of the edge device Ei, the time when the switching section 706 of the edge device Ei has received the result of executing the preprocess (in step S913). In this case, the switching section 706 of the edge device Ei also notifies a data amount of the result of executing the preprocess to the processing time period measurer 704 of the edge device Ei.

Upon receiving the data amount and the time when the switching section 706 of the edge device Ei has received the result of executing the preprocess, the processing time period measurer 704 of the edge device Ei calculates a data processing time period based on the process request time notified in step S909 (in step S914). For example, the processing time period measurer 704 of the edge device Ei calculates an initial data processing time period based on the difference between the process request time and the time when the switching section 706 of the edge device Ei has received the result of executing the preprocess. In the next or later calculation, the processing time period measurer 704 of the edge device Ei calculates a data processing time period based on the difference between the time when the switching section 706 of the edge device Ei has previously received the result of executing the preprocess and the time when the switching section 706 of the edge device Ei has most recently received the result of executing the preprocess. The data processing time period, however, includes the data reading time period taken to read the data (divided data items).

The switching section 706 of the edge device Ei notifies the received result of executing the preprocess to the transferring section 707, and the transferring section 707 transfers the result of executing the preprocess to the managing device 101 (in step S915). The processing time period measurer 704 of the edge device Ei notifies the calculated data processing time period to the process controller 701 of the edge device Ei (in step S916). In this case, the processing time period measurer 704 of the edge device Ei also notifies the data amount of the result of executing the preprocess to the process controller 701 of the edge device Ei.

The switching section 706 of the edge device Ei notifies a transfer time of the result of executing the preprocess to the transfer time period measurer 705 of the edge device Ei (in step S917). The transfer time indicates the time when the transferring section 707 transfers the result of executing the preprocess to the managing device 101. In this case, the switching section 706 of the edge device Ei also notifies an ACK reception time to the transfer time period measurer 705 of the edge device Ei. The ACK reception time is the time when the transferring section 707 receives an ACK from the managing device 101.

Upon receiving the transfer time and the ACK reception time, the transfer time period measurer 705 of the edge device Ei measures a data transfer time period based on the difference between the transfer time and the ACK reception time (in step S918). Then, the transfer time period measurer 705 of the edge device Ei notifies the measured data transfer time period to the process controller 701 of the edge device Ei (in step S919).

Upon receiving the data reading time period (and the data amount), the data processing time period (and the data amount), and the data transfer time period (and the data amount), the process controller 701 of the edge device Ei calculates the reading rate Sr, the processing rate Sp, and the transfer rate St (in step S920).

The received data processing time period, however, includes the data reading time period taken to read the data (divided data items). Thus, in the calculation of the processing rate Sp, a time period obtained by subtracting the data reading time period of the data (divided data items) from the received data processing time period is used. The data reading time period of the data (divided data items) may be calculated from the amount of the data (divided data items) and the reading rate Sr.

In the sequence diagram of FIG. 9C, the process manager 601 of the managing device 101 receives a request to cancel the preprocess from the external application (in step S921). The process manager 601 of the managing device 101 transmits the request to cancel the preprocess to the edge device Ei in response to the reception of the request to cancel the preprocess (in step S922).

Upon receiving the request to cancel the preprocess from the managing device 101, the process controller 701 of the edge device Ei notifies the request to cancel the preprocess to the processing section 702 (in step S923). As a result, the execution of the preprocess by the processing section 702 is canceled.

Next, the process controller 701 of the edge device Ei determines whether the canceled preprocess is to be executed (in step S924). For example, the process controller 701 calculates the reading time period Tr, the processing time period Tp, and the transfer time period Tt based on the calculated reading rate Sr, the calculated processing rate Sp, and the calculated transfer rate St. Then, the process controller 701 determines, based on a result of comparing the processing time period Tp with the reading time period Tr or the transfer time period Tt, whether the canceled preprocess is to be executed and whether the result of executing the preprocess is to be stored.

This case assumes that the process controller 701 determines that the canceled preprocess is to be executed and that the result of executing the preprocess is to be stored.

In this case, the process controller 701 of the edge device Ei instructs the switching section 706 to switch an output destination of the result of executing the canceled preprocess from the transferring section 707 to the storage 710 (in step S925). As a result, the output destination of the result of executing the canceled preprocess is switched to the storage 710.

Next, the process controller 701 of the edge device Ei causes the processing section 702 to execute the canceled preprocess (in step S926). The processing section 702 of the edge device Ei notifies the result of executing the preprocess to the switching section 706 (in step S927).

Upon receiving the result of executing the preprocess, the switching section 706 of the edge device Ei writes the received result of executing the preprocess to the storage 710 (for example, the execution result table 800) (in step S928). The result of executing the preprocess is the result of executing the preprocess on all the target data.

Thus, only when it is expected to reduce a time period from the start of the process Pi to the transfer of the result of executing the process PT upon a request to execute the process next or later, the process Pi may be executed in advance and the result of executing the process Pi may be stored in advance.

As described above, in the information processing system 100 according to the first embodiment, when the execution of the process Pi by the edge device Ei on the target data is canceled in accordance with a cancellation request from the source that has requested the process Pi, the edge device Ei may determine, based on the processing rate of the process Pi by the edge device Ei, whether the process Pi is to be executed and whether the result of executing the process Pi is to be stored.

It is, therefore, possible to execute the process Pi in advance and determine whether the result of executing the process PI is to be stored in advance for a request to execute the process next or later based on the processing rate of the process Pi by the edge device Ei. For example, only when it is estimated to reduce the time period from the start of the process Pi to the transfer of the result of executing the process Pi, compared with the case where the process Pi is executed upon a request to execute the process next or later, the process Pi may be executed in advance and the result of executing the process Pi may be stored in advance. In other words, it may be possible to inhibit the process Pi from being executed in advance and inhibit a pointless process, such as storage of the result of executing the process Pi, from being executed in advance, regardless of the fact that it is not estimated that the time period from the start of the process Pi to the transfer of the result of executing the process Pi is reduced.

The edge device Ei may determine, based on the processing rate of the process Pi and the rate of the reading of the target data from the storage 710 storing the target data, whether the canceled process Pi is to be executed and whether the result of executing the process Pi is to be stored.

Thus, when the execution (data processing) of the process Pi is a bottleneck rather than the reading of the target data, the process Pi may be executed in advance and the result of executing the process Pi may be stored in advance. In other word, when the reading of the target data is a bottleneck rather than the execution (data processing) of the process Pi, the process Pi may not be executed in advance.

The edge device Ei may determine, based on the processing rate of the process Pi and the rate of the transfer of the result of executing the process Pi to the source (managing device 101) that has requested the process Pi, whether the canceled process Pi is to be executed and whether the result of executing the process Pi is to be stored.

Thus, when the execution (data processing) of the process Pi is a bottleneck rather than the transfer of the data (execution result) to the source that has requested the process Pi, the process Pi may be executed in advance and the result of executing the process Pi may be stored in advance. In other words, when the transfer of the data (execution result) is a bottleneck rather than the execution (data processing) of the process Pi, the process Pi may not be executed in advance.

When the edge device Ei determines that the canceled process Pi is to be executed and that the result of executing the process Pi is to be stored, the edge device Ei may cause the processing section 702 to execute the canceled process Pi and may associate the result of executing the process Pi with the information (for example, the data name and the process name) identifying the target data and the process Pi and cause the result of executing the process Pi to be stored in the storage 710.

Thus, the data name and the process name that are included in a request to execute the process Pi next or later may be used as a key to search for and return the execution result associated with the data name and the process name from the storage 710.

When the remaining number of times that data is able to be written to the storage 710 is equal to or smaller than the predetermined value α, the edge device Ei may determine that the canceled process Pi is not to be executed and that the result of executing the process Pi is not to be stored.

Thus, it may be possible to inhibit the lifetime of the storage 710 from being reduced due to the writing of temporary data (result of executing the process Pi for a request to execute the process next or later).

Thus, in the information processing system 100 according to the first embodiment, the efficiency of the process to be executed on data accumulated in the edge device Ei may be improved.

Second Embodiment

Next, an information processing system 100 according to the second embodiment is described. Note that the same parts as those described in the first embodiment are denoted by the same reference numerals, and an illustration and description thereof are omitted.

In the information processing system 100 according to the second embodiment, for example, multiple edge devices that execute a preprocess requested by a managing device 101 in accordance with a process request from the external application or the like may exist. In this case, in a cloud (managing device 101), the analysis process or the like is executed after the reception of all results of executing the preprocess from the multiple edge devices.

An entire processing time period in the case where the analysis process is executed after the reception of all the results of executing the preprocess from the multiple edge devices is described below. The multiple edge devices that execute the preprocess requested by the managing device 101 are referred to as "edge devices E1, E2, and E3".

Figure 10:
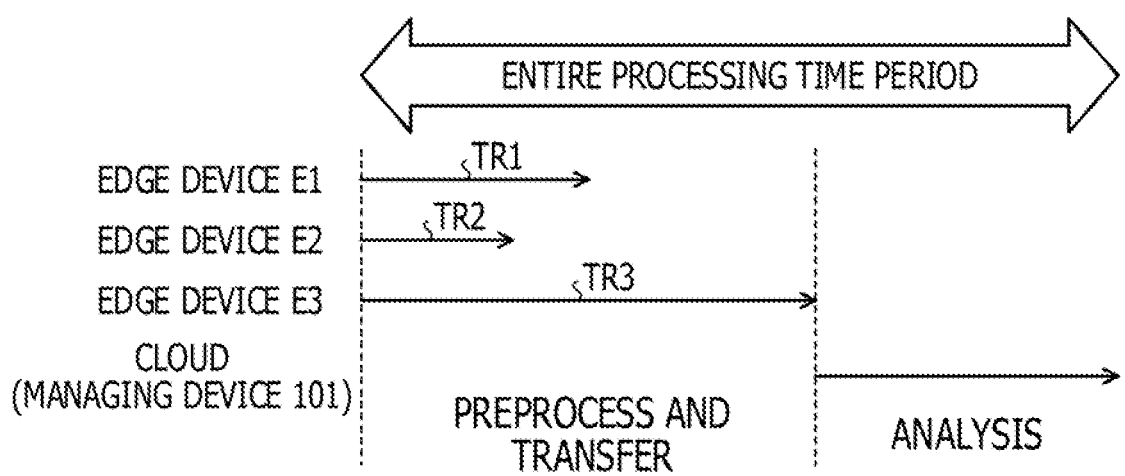
FIG. 10 is an explanatory diagram illustrating an entire processing time period to the completion of an analysis process.

FIG. 10 is an explanatory diagram illustrating the entire processing time period to the completion of the analysis process. As illustrated in FIG. 10, it is assumed that time periods TR1, TR2, and TR3 from the start of the preprocess to time points when the results of executing the preprocess by the edge devices E1, E2, and E3 are transferred to the managing device 101 are different from each other due to processing performance of the edge devices E1, E2, and E3, the amount of the target data, a network status, and the like.

In an example illustrated in FIG. 10, the time period TR3 to the time point when the result of executing the preprocess by the edge device E3 is transferred to the managing device 101 is the longest among the time periods TR1, TR2, and TR3. Thus, when the analysis process is executed in the cloud using all the results of executing the preprocess by the edge devices E1 to E3, the entire processing time period is long, depending on the edge device E3 that causes the time period TR3 to be long. In other words, even when latency of the edge devices E1 and E2 is suppressed to small values, the entire processing time period is determined based on latency of the edge device E3. The latency of the edge device E3 is the longest among the latency of the edge devices E1 to E3.

Thus, in the second embodiment, when a process of collecting data from multiple edge devices is canceled, only an edge device that is among the multiple edge devices and contributes to a reduction in the entire processing time period determines that the canceled process is to be executed and that a result of executing the process is to be stored. Thus, while a pointless process that does not contribute to a reduction in the entire processing time period is not executed, a resource may be efficiently used.

(Example of Functional Configuration of Edge Device Ei)

Next, an example of a functional configuration of an edge device Ei according to the second embodiment is described.

Figure 11:
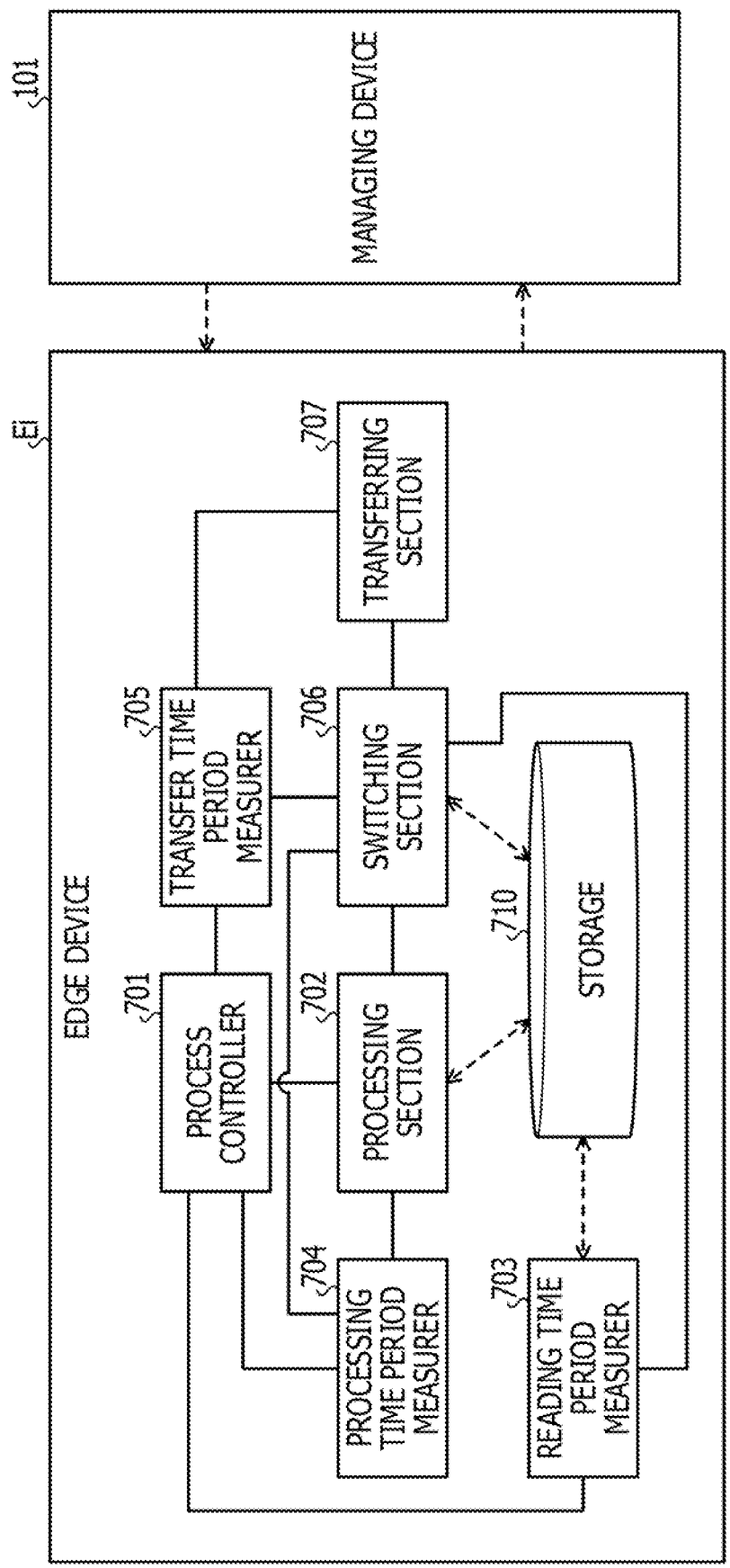
FIG. 11 is a block diagram illustrating an example of a functional configuration of an edge device according to a second embodiment.

FIG. 11 is a block diagram illustrating the example of the functional configuration of the edge device Ei according to a second embodiment; In FIG. 11, the edge device Ei includes a process controller 701, a processing section 702, a reading time period measurer 703, a processing time period measurer 704, a transfer time period measurer 705, a switching section 706, and a transferring section 707. A different feature from the example, illustrated in FIG. 7, of the functional configuration of the edge device Ei according to the first embodiment is that the reading time period measurer 703, the processing time period measurer 704, the transfer time period measurer 705 are coupled to the switching section 706 in the edge device Ei according to the second embodiment.

Only different functions from the edge device Ei according to the first embodiment are described below.

The reading time period measurer 703 notifies a measured data reading time period and, for example, the amount of the dummy data to the managing device 101. For example, the data reading time period (and the amount of the dummy data) is output to the switching section 706 and output from the switching section 706 to the transferring section 707. The transferring section 707 transfers the data reading time period (and the amount of the dummy data) received from the switching section 706 to the managing device 101.

The processing time period measurer 704 notifies a measured data processing time period and, for example, a total amount of the divided data items to the managing device 101. For example, the data processing time period (and the total amount of the divided data items) is output to the switching section 706 and output from the switching section 706 to the transferring section 707. The transferring section 707 transfers the data processing time period (and the total amount of the divided data items) received from the switching section 706 to the managing device 101.

The transfer time period measurer 705 notifies a measured data transfer time period and, for example, a total data amount of results of executing the process Pi on the divided data items to the managing device 101. For example, the data transfer time period (and the total data amount of the execution results) is output to the switching section 706 and output from the switching section 706 to the transferring section 707. The transferring section 707 transfers the data transfer time period (and the total data amount of the execution results) received from the switching section 706 to the managing device 101.

When the execution of the process Pi is canceled in accordance with a cancellation request, the process controller 701 may determine, in response to the reception of a request to continue the preprocess from the managing device 101, whether the canceled process Pi is to be executed and whether the result of executing the process Pi is to be stored. The request to continue the preprocess is a request to execute the canceled process Pi and store the result of executing the process Pi in the edge device Ei (storage 710).

In this case, the process controller 701 may determine, in response to the reception of the request to continue the preprocess from the managing device 101, as described in the first embodiment, whether the canceled process Pi is to be executed and whether the result of executing the process Pi is to be stored. For example, the process controller 701 may determine, based on a result of comparing the processing time period Tp with the reading time period Tr or the transfer time period Tt, whether the canceled process Pi is to be executed and whether the result of executing the process PI is to be stored.

The process controller 701 may determine, in response to the reception of the request to continue the preprocess from the managing device 101, that the canceled process Pi is to be executed and that the result of executing the process Pi is to be stored. In other words, upon receiving the request to continue the preprocess from the managing device 101, the process controller 701 may determine that the canceled process Pi is to be executed and that the result of executing the process Pi is to be stored.

(Example of Functional Configuration of Managing Device 101)

Next, an example of a functional configuration of the managing device 101 according to the second embodiment is described. The example of the functional configuration of the managing device 101 according to the second embodiment, however, is the same as or similar to the example of the functional configuration of the managing device 101 according to the first embodiment, and an illustration thereof is omitted.

Only different functions from the managing device 101 according to the first embodiment are described below. In the following description, multiple edge devices that execute a process requested by the managing device 101 in accordance with a process request from the external application or the like are referred to as "multiple edge devices E", and the process instructed by the managing device 101 to be executed is referred to as "process P".

When the execution of the process P by the multiple edge devices E on the data is canceled, the process manager 601 calculates latency to be taken for the process P by each of the multiple edge devices E. For example, when the execution of the process P by the multiple edge devices E on the data is canceled in accordance with a cancellation request from the external application or the like, the process manager 601 calculates the latency to be taken for the process P by each of the edge devices E.

The latency to be taken for the process P by each of the edge devices E is a total time period to be taken to read the target data and transfer the result of executing the process P on the target data. In other words, the latency to be taken for the process P by each of the edge devices E is the total of the reading time period Tr, processing time period Tp, and transfer time period Tt of the edge device E.

For example, the process manager 601 calculates the rate Sr of the reading of the target data by each of the edge devices E. The reading rate Sr is the amount of data to be read per unit of time. For example, the process manager 601 calculates the reading rate Sr of each of the edge devices E by dividing the amount, received by the communication section 602 from the edge device E, of the dummy data by the data reading time period received by the communication section 602 from the edge device E.

The process manager 601 calculates the processing rate Sp of the process P by each of the edge devices E. For example, the process manager 601 calculates the processing rate Sp by dividing the total amount, received by the communication section 602 from each of the edge devices E, of the divided data times by the data processing time period received by the communication section 602 from the edge device E.

Each of the edge devices E may notify the amounts of the multiple divided data items and the data processing time period. In this case, the process manager 601 may calculate, as the processing rate Sp, an average value of calculated processing rates of the multiple divided data items. When the data reading time period taken to read the data (divided data items) is included in the data processing time period notified by each of the edge devices E, a time period obtained by subtracting the data reading time period of the data (divided data items) from the received data processing time period is used in the calculation of the processing rate Sp.

The process manager 601 calculates the rate St of the transfer of the results of executing the process P by the edge devices E. For example, the process manager 601 calculates the transfer rate St by dividing the total data amount, received by the communication section 602 from each of the edge devices E, of the results of executing the process Pi on the divided data items by the data transfer time period received by the communication section 602 from the edge device E.

Each of the edge devices E may notify the data transfer time period and the data amounts of the results of executing the process Pi on the multiple divided data items. In this case, the process manager 601 may calculate, as the transfer rate St, an average value of calculated rates of the transfer of the multiple divided data items.

Figure 12:
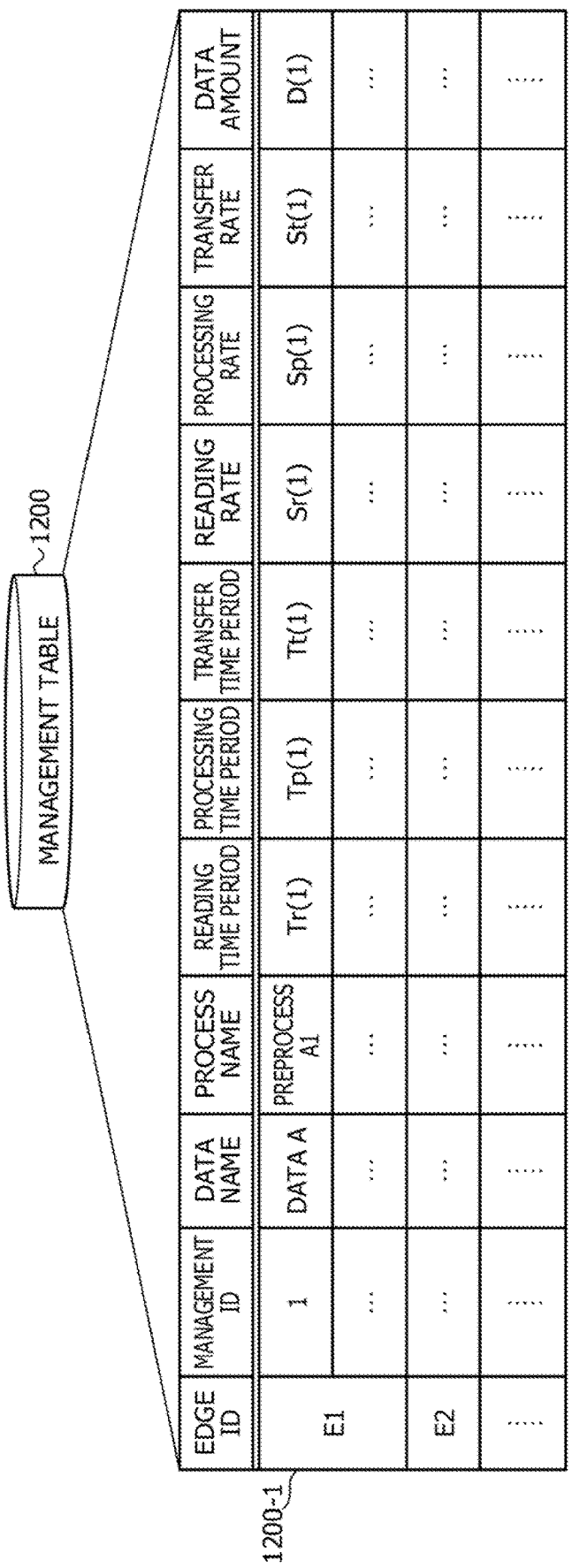
FIG. 12 is an explanatory diagram illustrating an example of stored details of a management table.

The calculated reading rate Sr, processing rate Sp, and transfer rate St of each of the edge devices E are associated with an edge ID of the edge device E, the name of the target data in the edge device E, the amount of the target data, and the name of the process P and stored in a management table 1200 as illustrated in FIG. 12. The management table 1200 is enabled by a storage device, such as the memory 402, disc 404, or the like of the managing device 101 illustrated in FIG. 4.

FIG. 12 is an explanatory diagram illustrating an example of stored details of the management table 1200. In FIG. 12, the management table 1200 includes fields for an edge ID, a management ID, a data name, a process name, a reading time period, a processing time period, a transfer time period, a reading rate, a processing rate, a transfer rate, and a data amount and stores, as a record, management information (for example, management information 1200-1) by setting the information in the fields.

The edge ID is an identifier uniquely identifying an edge device E. The management ID is an identifier uniquely identifying the record in the edge device E. The data name is the name of data to be processed. The process name is the name of the process P to be executed on the data to be processed. The reading time period is the length of time it takes to read the data to be processed. The processing time period is the length of time it takes to execute the process Pi on the data to be processed. The transfer time period is the length of time it takes to transfer the result of executing the process P.

The reading rate is the amount of data to be read per unit of time. The reading rate is expressed in, for example, bytes per second. The processing rate is the amount of data to be processed per unit of time. The processing rate is expressed in, for example, bytes per second. The transfer rate is the amount of data to be transferred per unit of time. The transfer rate is expressed in, for example, bytes per second.

The data amount is the amount of the data to be processed. The data amount is expressed in, for example, bytes.

For example, the process manager 601 references the management table 1200 and calculates a reading time period Tr for each of the edge devices E by multiplying a reading rate Sr of the edge device E by the amount of the target data. The process manager 601 references the management table 1200 and calculates a processing time period Tp by multiplying a processing rate Sp of each of the edge devices E by the amount of the target data. In this case, the processing time period Tp is the length of time it takes for each of the edge devices E to execute the process P on the target data.

The process manager 601 calculates an average value (average data amount) of the data amounts, notified by each of the edge devices E, of the results of executing the process P on the divided data items. Then, the process manager 601 estimates the data amount of the result of executing the process P on the target data by multiplying the calculated average data amount by the number N of divided data items obtained by dividing the target data.

Then, the process manager 601 references the management table 1200 and calculates the transfer time period Tt to be taken to transfer the result of executing the process P on the target data in each of the edge devices E by multiplying the transfer rate St of the edge device E by the estimated data amount. The number N of divided data items obtained by dividing the target data in each of the edge devices E is, for example, notified by the edge device E to the managing device 101.

The calculated reading time period Tr, processing time period Tp, and transfer time period Tt of each of the edge devices E are associated with an edge ID of the edge device E, the name of the target data in the edge device E, the amount of the target data, and the name of the process P and stored in the management table 1200.

The process manager 601 references the management table 1200 and calculates the latency to be taken for the process P by each of the edge devices E by summing the reading time period Tr, processing time period Tp, and transfer time period Tt of the edge device E. In the calculation of the transfer time period Tt of each of the edge devices E, the amount of the target data may be used, instead of the estimated data amount of the result of executing the process P on the target data.

Next, the process manager 601 determines, based on the calculated latency of each of the edge devices E and the processing time period Tp of the process P by each of the edge devices E, whether the canceled process P is to be executed by each of the edge devices E and whether the result of executing the process P is to be stored in each of the edge devices E. For example, the process manager 601 references the management table 1200 and determines that the canceled process P is to be executed by a first edge device E and that the result of executing the process P is to be stored in the first edge device E. In this case, the first edge device E is among the multiple edge devices E, and latency of the first edge device E is the longest among the latency of the multiple edge devices E.

In this case, the process manager 601 transmits a request to continue the preprocess to the first edge device E. The request to continue the preprocess is a request to execute the canceled process P and store the result of executing the process P in the edge device E (storage 710).

Next, the process manager 601 compares a time period obtained by subtracting the processing time period Tp of the process P by the first edge device E from the longest latency of the first edge device E among the latency of the multiple edge devices E, with latency of a second edge device E among the multiple edge devices E. The latency of the second edge device E is the second longest among the latency of the multiple edge devices E. Then, the process manager 601 determines, based on a result of the comparison, whether the canceled process P is to be executed by the second edge device E and whether the result of executing the process P is to be stored in the second edge device E.

For example, when the latency of the second edge device E is longer than a time period obtained by subtracting the processing time period Tp of the first edge device E from the latency of the first edge device E, the process manager 601 determines that the canceled process P is to be executed by the second edge device E and that the result of executing the process P is to be stored in the second edge device E. Then, the process manager 601 treats the second edge device E as the first edge device E of which the latency is the longest. After that, the process manager 601 executes the same process as described above.

On the other hand, when the latency of the second edge device E is equal to or shorter than the time period obtained by subtracting the processing time period Tp of the first edge device E from the latency of the first edge device E, the process manager 601 determines that the canceled process P is not to be executed by the second edge device E and that the result of executing the process P is not to be stored in the second edge device E. In this case, the process manager 601 determines that the canceled process P is not to be executed by another edge device E of which latency is shorter than the latency of the second edge device E and that the result of executing the process P is not to be stored in the other edge device E.

Thus, since the process P is executed in advance, the request to continue the preprocess may be notified to only an edge device E that is among the multiple edge devices E and causes a reduction in a total processing time period upon a request to execute the process next or later.

The latency to be taken for the process P by each of the edge devices E may be calculated by the edge device E and notified to the managing device 101. In this case, the managing device 101 may not calculate the latency of each of the edge devices E. Then, the managing device 101 may use the latency notified by the edge devices E to determine whether the canceled process P is to be executed by each of the edge devices E and whether the result of executing the process P is to be stored in each of the edge devices E.

(Stored Details of Execution Result Table 1300)

Figure 13:
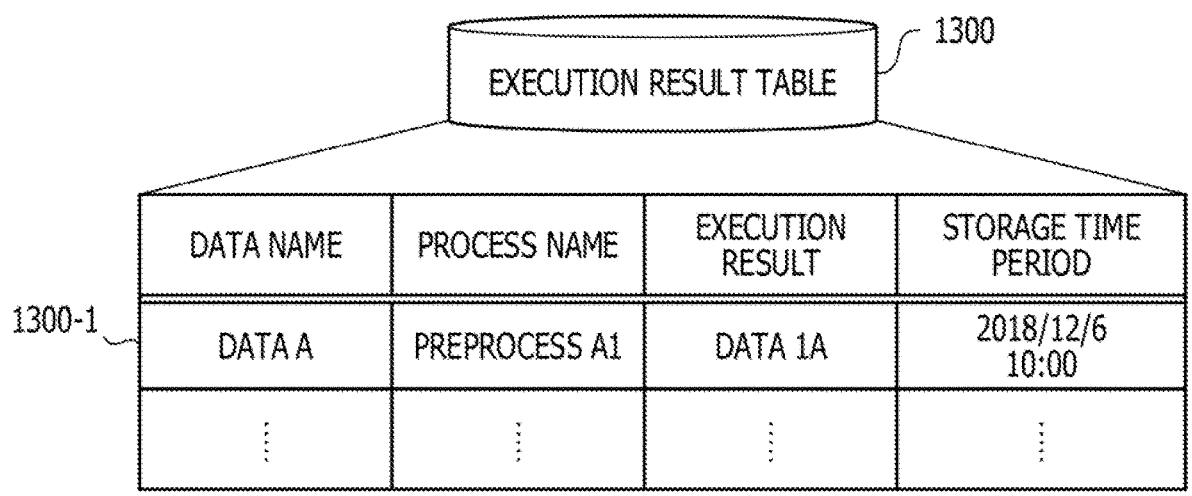
FIG. 13 is an explanatory diagram illustrating an example of stored details of an execution result table.

The results of executing the process P are received by the communication section 602 from the edge devices E and written to, for example, an execution result table 1300 in the storage 610 of the managing device 101 as illustrated in FIG. 13. Stored details of the execution result table 1300 are described below.

FIG. 13 is an explanatory diagram illustrating an example of the stored details of the execution result table 1300. In FIG. 13, the execution result table 1300 has fields for a data name, a process name, an execution result, and a storage time period and stores, as a record, execution result information (for example, execution result information 1300-1) by setting the Information in the fields.

The data name is the name of the target data. The process name is the name of the process P. The execution result is the result of executing the process P on the target data. In the example illustrated in FIG. 13, a data name of the result of executing the process P on the target data is indicated in the execution result field. The storage time period is a time period for which the result of executing the process P on the target data is stored. The storage time period may be set to an arbitrary time period. For example, the storage time period is set to a time period of several weeks from the time and date when the process P is requested to be executed. In the example Illustrated in FIG. 13, the final time and date of the storage time period are set in the storage time period field.

When a request to execute the same process as the executed process P is provided, the managing device 101 may use the execution result within the execution result table 1300.

However, when the execution result is continuously stored in the execution result table 1300, an available capacity of the storage 610 may become insufficient. Thus, the storage time period for which the result of executing the process P is stored is set in the managing device 101. The process manager 601 references the execution result table 1300 and deletes, from the execution result table 1300, a result, stored for a time period longer than the storage time period, of executing the process P.

Thus, unused data is deleted and it may be possible to inhibit an available capacity of the storage 610 from becoming insufficient.

The process manager 601 may extend the storage time period based on the frequency with which the result of executing the process P is used. For example, every time the process manager 601 receives a request to execute the process P, the process manager 601 may extend the storage time period for storing the result of executing the process P. For example, every time the process manager 601 receives a request to execute the process P, the process manager 601 may extend the storage time period for storing the result of executing the process P by several days. This may inhibit data that is frequently used from being deleted.

When the storage time period for storing the result of executing the process P is frequently extended and exceeds a certain time period, the process manager 601 may disclose the result of executing the process P. For example, the result of executing the process P may be disclosed so that the result of executing the process P is accessible on the Internet, and the storage time period may not be set.

An example of the use of the result of executing the process P is described below with reference to FIG. 14. "Data 1A" that is a result of executing a "preprocess 1A" is exemplified and described as the result of executing the process P.

Figure 14:
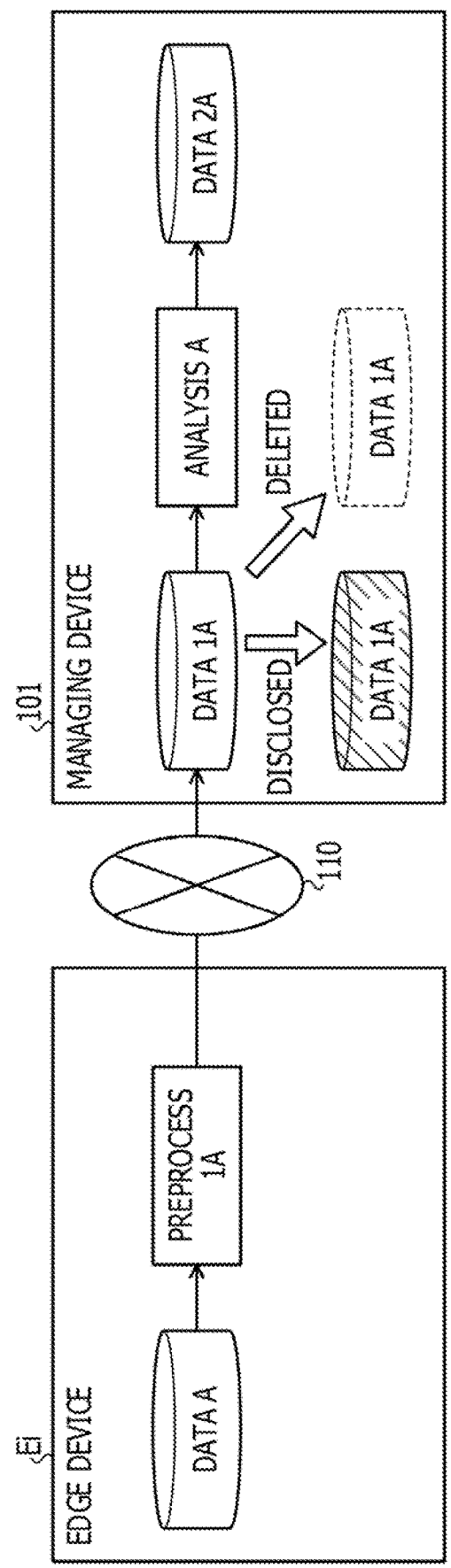
FIG. 14 is an explanatory diagram illustrating an example of the use of a result of executing a preprocess.

FIG. 14 is an explanatory diagram illustrating an example of the use of the result of executing the preprocess. In FIG. 14, the data 1A stored in the managing device 101 is a result of executing the preprocess 1A by the edge device E. When the data 1A is not used and a time period for storing the data 1A exceeds the storage time period, the data 1A is deleted.

On the other hand, when the data 1A is frequently used and the time period for storing the data 1A exceeds the certain time period, the data 1A is disclosed. Thus, the data 1A that is frequently used may be disclosed and made searchable on the Internet or the like and may be used by another analyst or an application.

(Example of Operations of Information Processing System 100)

Figure 15A:
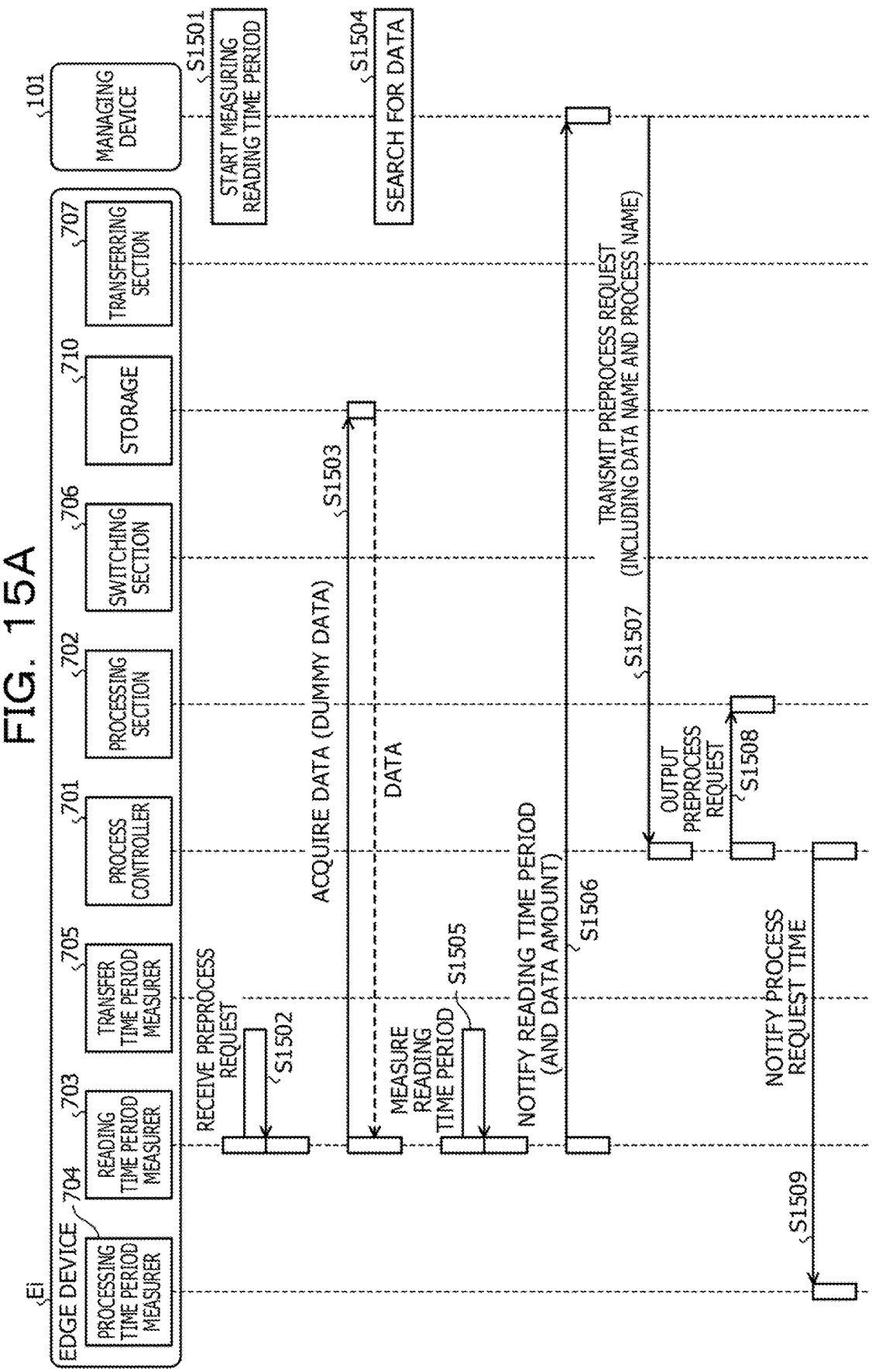
FIG. 15A is a first sequence diagram illustrating an example of operations of an information processing system according to the second embodiment.
Figure 15B:
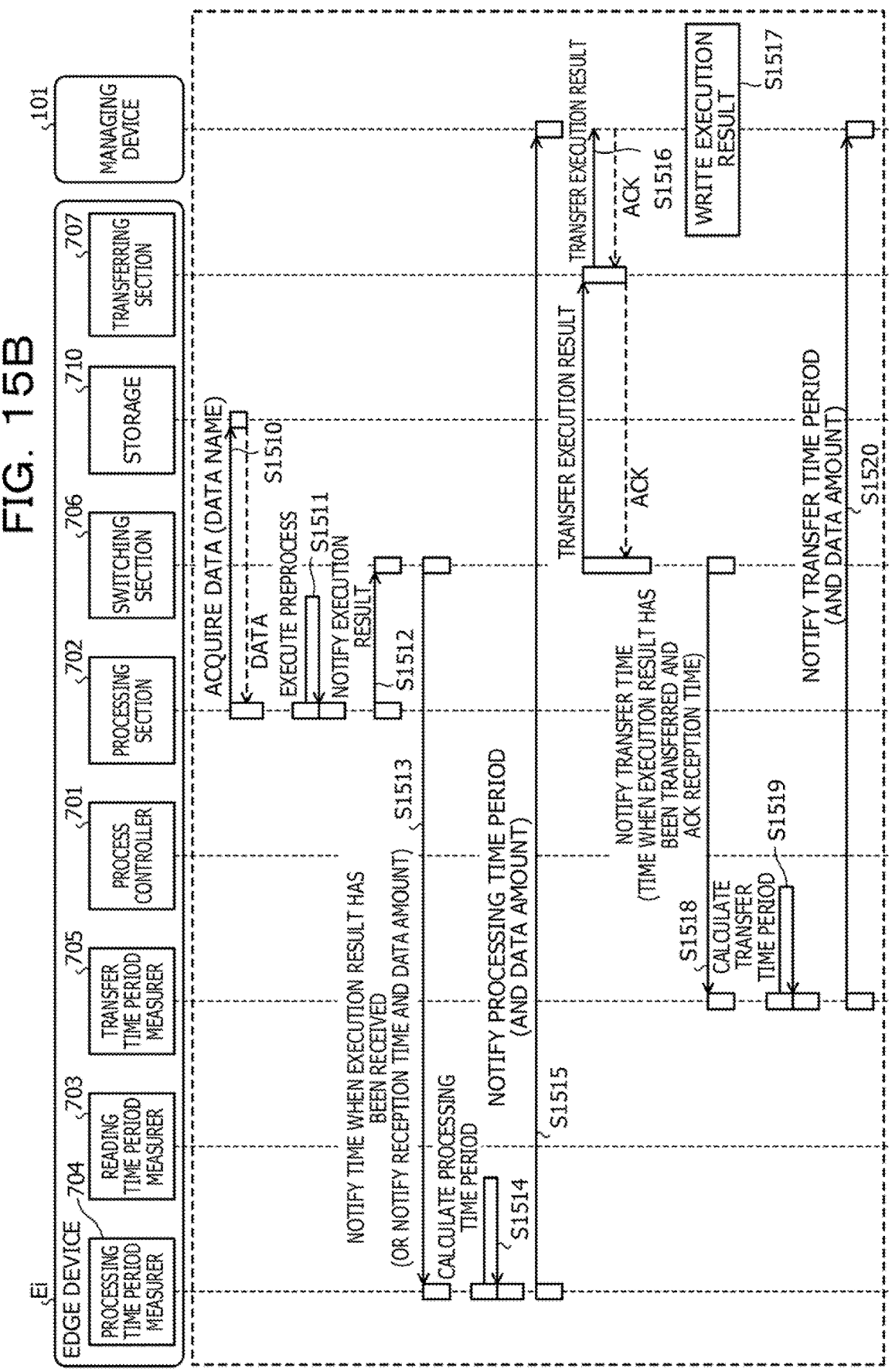
FIG. 15B is a second sequence diagram illustrating the example of the operations of the information processing system according to the second embodiment.
Figure 15C:
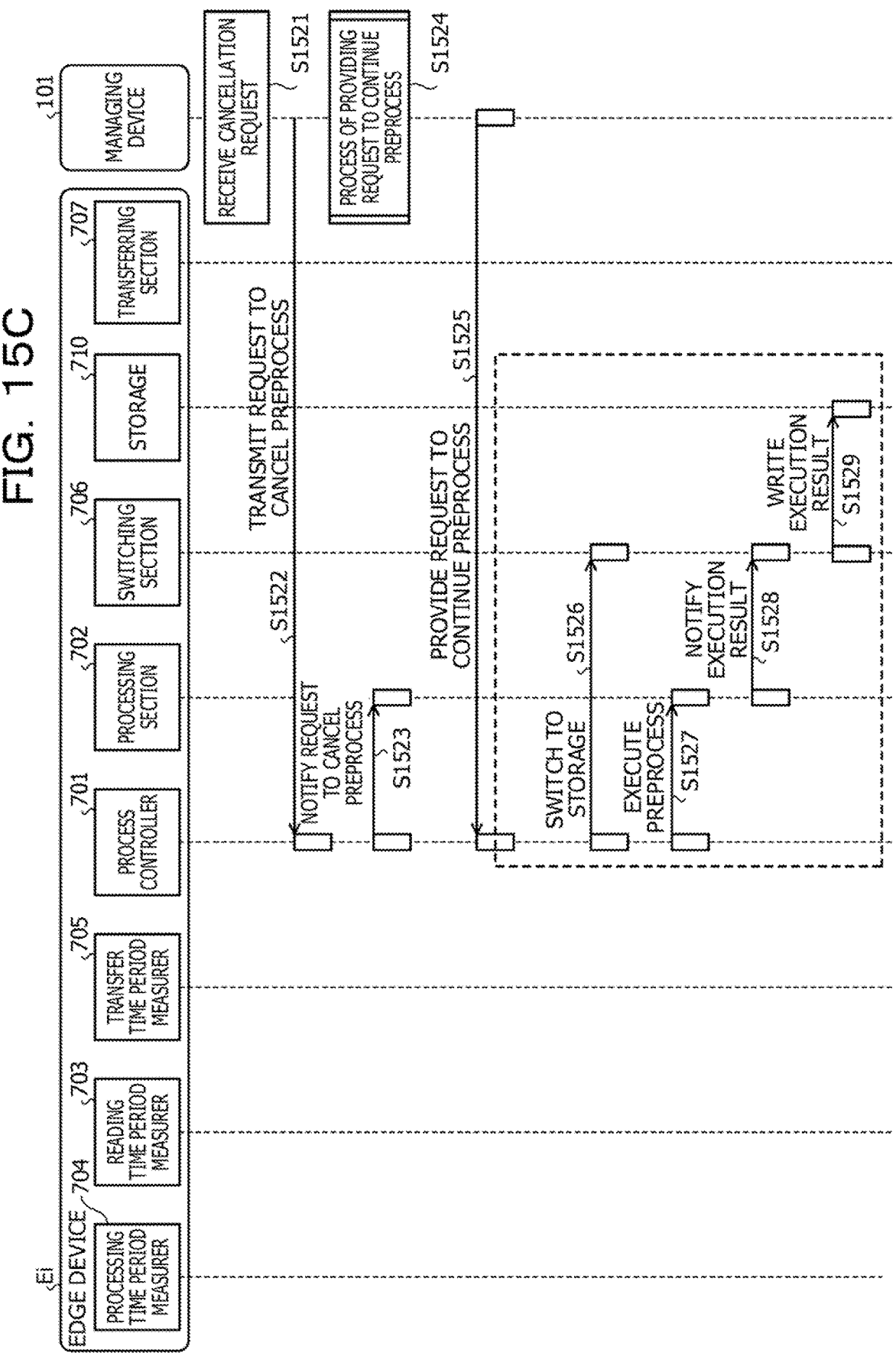
FIG. 15C is a third sequence diagram illustrating the example of the operations of the information processing system according to the second embodiment.

Next, an example of operations of the information processing system 100 according to the second embodiment is described with reference to FIGS. 15A, 15B, and 15C. In FIGS. 15A, 15B, and 15C, an illustration of the functional sections of the managing device 101 is omitted. FIGS. 15A, 15B, and 15C Illustrate an example of operations of only a single edge device Ei among the multiple edge devices E requested by the managing device 101 to execute the preprocess.

FIGS. 15A, 15B, and 15C are sequence diagrams illustrating the example of the operations of the information processing system 100 according to the second embodiment. In the sequence diagram of FIG. 15A, first, the process manager 601 of the managing device 101 receives a preprocess request from the external application (in step S1501).

The reading time period measurer 703 of the edge device Ei starts to measure a data reading time period (in step S1502). Next, the reading time period measurer 703 of the edge device Ei reads the dummy data from the storage 710 (in step S1503). The process manager 601 of the managing device 101 references the data storage information DB 130 (refer to FIG. 1) and searches for data identified from the received preprocess request (in step S1504).

After completing the reading of the dummy data, the reading time period measurer 703 of the edge device Ei measures the data reading time period (in step S1505). Then, the reading time period measurer 703 of the edge device Ei notifies the measured data reading time period and the amount of the dummy data to the managing device 101 (in step S1506). In this case, the reading time period measurer 703 of the edge device Ei also notifies the data reading time period (and the amount of the dummy data) to the process controller 701.

Then, the process manager 601 of the managing device 101 transmits the preprocess request to the edge device Ei storing the data searched in step S1504 (in step S1507). The preprocess request corresponds to the request to execute the process Pi and includes the name of the data and the name of the process.

Upon receiving the preprocess request from the managing device 101, the process controller 701 of the edge device Ei outputs a request to execute the preprocess to the processing section 702 (in step S1508). Then, the process controller 701 of the edge device Ei notifies a process request time to the processing time period measurer 704 of the edge device Ei (in step S1509).

In the sequence diagram illustrated in FIG. 15B, the processing section 702 of the edge device Ei acquires, from the storage 710, the data associated with the data name included in the request, received from the process controller 701, to execute the preprocess in accordance with the request to execute the preprocess (in step S1510). It is assumed that the preprocess is sequentially executed on each of divided data items obtained by dividing the target data. A series of processes surrounded by a dotted frame in FIG. 15B are executed on each of the divided data obtained by dividing the target data.

Then, the processing section 702 of the edge device Ei executes the preprocess on the acquired data (in step S1511). Next, the processing section 702 of the edge device Ei notifies a result of executing the preprocess on the data to the switching section 706 of the edge device Ei (in step S1512).

Upon receiving the result of executing the preprocess, the switching section 706 of the edge device Ei notifies, to the processing time period measurer 704 of the edge device Ei, the time when the switching section 706 of the edge device Ei has received the result of executing the preprocess (in step S1513). In this case, the switching section 706 of the edge device Ei also notifies a data amount of the result of executing the preprocess to the processing time period measurer 704 of the edge device Ei.

Upon receiving the data amount and the time when the switching section 706 of the edge device Ei has received the result of executing the preprocess, the processing time period measurer 704 of the edge device Ei calculates a data processing time period based on the process request time notified in step S1509 (in step S1514).

The processing time period measurer 704 of the edge device Ei notifies the calculated data processing time period to the managing device 101 (in step S1515). In this case, the processing time period measurer 704 of the edge device Ei also notifies the data amount of the result of executing the preprocess to the managing device 101. The processing time period measurer 704 of the edge device Ei also notifies the data processing time period (and the data amount) to the process controller 701.

The switching section 706 of the edge device Ei notifies the received result of executing the preprocess to the transferring section 707, and the transferring section 707 transfers the result of executing the preprocess to the managing device 101 (in step S1516). Upon receiving the result of executing the preprocess from the edge device Ei, the communication section 602 of the managing device 101 writes the received result of executing the preprocess to the storage 610 (in step S1517).

The switching section 706 of the edge device Ei notifies, to the transfer time period measurer 705 of the edge device Ei, the time when the result of executing the preprocess has been transferred (in step S1518). In this case, the switching section 706 of the edge device Ei also notifies an ACK reception time to the transfer time period measurer 705 of the edge device Ei.

Upon receiving the transfer time and the ACK reception time, the transfer time period measurer 705 of the edge device Ei measures a data transfer time period based on the difference between the transfer time and the ACK reception time (in step S1519). Then, the transfer time period measurer 705 of the edge device Ei notifies the measured data transfer time period to the managing device 101 (in step S1520). In this case, the transfer time period measurer 705 of the edge device Ei also notifies the data amount of the result of executing the preprocess to the managing device 101. The processing time period measurer 704 of the edge device Ei also notifies the data transfer time period (and the data amount) to the process controller 701.

In the sequence diagram illustrated in FIG. 15C, the process manager 601 of the managing device 101 receives a request to cancel the preprocess from the external application (in step S1521). The process manager 601 of the managing device 101 transmits the request to cancel the preprocess to the edge device Ei in response to the reception of the request to cancel the preprocess (in step S1522).

Upon receiving the request to cancel the preprocess from the managing device 101, the process controller 701 of the edge device Ei notifies the request to cancel the preprocess to the processing section 702 (in step S1523). As a result, the execution of the preprocess by the processing section 702 is canceled.

The process manager 601 of the managing device 101 executes a process of providing a request to continue the preprocess (in step S1524). The process of providing the request to continue the preprocess is a process of determining an edge device Ei to which a request to continue the preprocess is to be notified. A specific procedure for the process of providing the request to continue the preprocess is described later with reference to FIG. 16.

Upon receiving the request to continue the preprocess from the managing device 101 (in step S1525), the process controller 701 of the edge device Ei determines whether the canceled preprocess is to be executed and whether a result of executing the preprocess is to be stored. For example, the process controller 701 calculates the reading time period Tr, the processing time period Tp, and the transfer time period Tt. Then, the process controller 701 determines, based on a result of comparing the processing time period Tp with the reading time period Tr or the transfer time period Tt, whether the canceled preprocess is to be executed and whether the result of executing the preprocess is to be stored.

This case assumes that the process controller 701 determines that the canceled preprocess is to be executed and that the result of executing the preprocess is to be stored. In this case, a series of processes surrounded by a dotted frame in FIG. 15C are executed as follows.

The process controller 701 of the edge device Ei instructs the switching section 706 to switch an output destination of the result of executing the canceled preprocess from the transferring section 707 to the storage 710 (in step S1526). As a result, the output destination of the result of executing the canceled preprocess is switched to the storage 710.

Then, the process controller 701 of the edge device Ei causes the processing section 702 to execute the canceled preprocess (in step S1527). The processing section 702 of the edge device Ei notifies the result of executing the preprocess to the switching section 706 (in step S1528).

Upon receiving the result of executing the preprocess, the switching section 706 of the edge device Ei writes the received result of executing the preprocess to the storage 710 (for example, the execution result table 800) (in step S1529). The result of executing the preprocess is the result of executing the preprocess on all the target data.

Next, a specific procedure for the process of providing the request to continue the preprocess in step S1524 illustrated in FIG. 15C is described with reference to FIG. 16.

Figure 16:
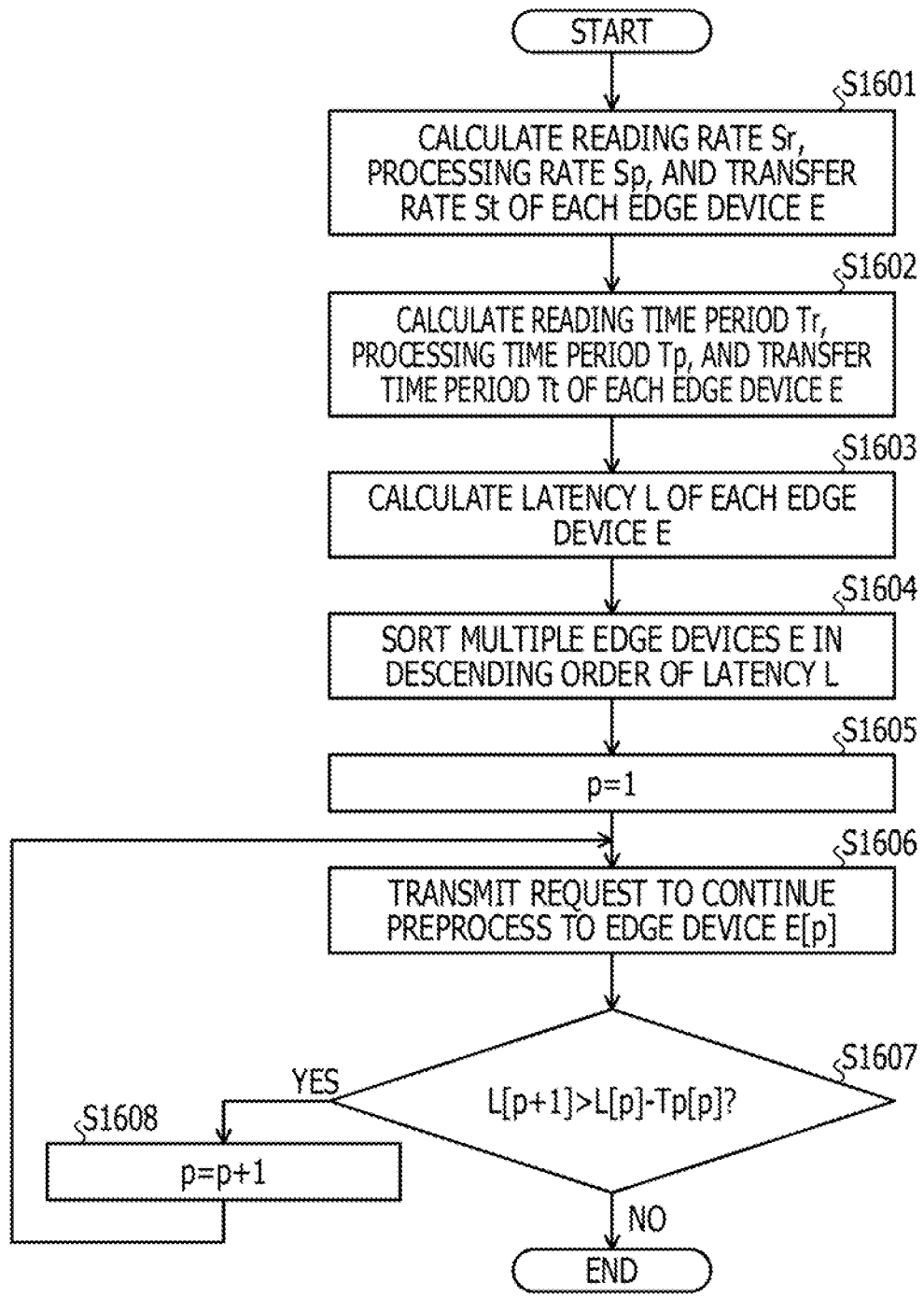
FIG. 16 is a flowchart illustrating an example of a specific procedure for a process of providing a request to continue a preprocess.

FIG. 16 is a flowchart illustrating an example of the specific procedure for the process of providing the request to continue the preprocess. In the flowchart of FIG. 16, first, the process manager 601 of the managing device 101 calculates the reading rate Sr, processing rate Sp, and transfer rate St of each of the edge devices E based on the received data reading time period (and data amount), data processing time period (and data amount), and data transfer time period (and data amount) of each of the edge devices E (in step S1601).

The received data processing time period, however, includes the data reading time period taken to read the data (divided data items). Thus, in the calculation of the processing rate Sp, a time period obtained by subtracting the data reading time period of the data (divided data items) from the received data processing time period is used.

Next, the process manager 601 of the managing device 101 calculates the reading time period Tr, processing time period Tp, and transfer time period Tt of each of the edge devices E based on the calculated reading rate Sr, processing rate Sp, and transfer rate St of each of the edge devices E (in step S1602). Then, the process manager 601 of the managing device 101 calculates latency L of each of the edge devices E based on the calculated reading time period Tr, processing time period Tp, and transfer time period Tt of each of the edge devices E (in step S1603).

Next, the process manager 601 of the managing device 101 sorts the multiple edge devices E in descending order of calculated latency L (in step S1604). In this case, the number of multiple edge devices E is "m" (m is a natural number of 2 or more), and the multiple edge devices E after the sorting are referred to as "edge devices E[1] to E[m]". An arbitrary edge device among the edge devices E[1] to E[m] is referred to as "edge device E[p]".

Next, the process manager 601 of the managing device 101 sets "p" to 1 (in step S1605) and transmits the request to continue the preprocess to the edge device E[p] (in step S1606). Then, the process manager 601 of the managing device 101 determines whether latency L[p+1] of an edge device E[p+1] is longer than a time period obtained by subtracting a processing time period Tp[p] from latency L[p] of the edge device E[p] (in step S1607). The processing time period Tp[p] is a processing time period Tp of the edge device E[p].

When the latency L[p+1] is longer than the time period obtained by subtracting the processing time period Tp[p] from the latency L[p] (Yes in step S1607), the process manager 601 of the managing device 101 increments "p" by 1 (in step S1608) and causes the process to return to step S1606.

On the other hand, when the latency L[p+1] is equal to or shorter than the time period obtained by subtracting the processing time period Tp[p] from the latency L[p] (No in step S1607), the process manager 601 of the managing device 101 terminates the process of the flowchart illustrated in FIG. 16.

Thus, only an edge device E that contributes to a reduction in an entire processing time period may be selected and the request to continue the preprocess may be notified to the selected edge device E. When the managing device 101 does not exist, any edge device E among the edge devices E1 to En may serve as a mask, operate as a managing device for managing the other edge devices E, calculate the latency, determine whether the canceled process P is to be executed and whether the result of executing the process P is to be stored, and provide the request to continue the preprocess.

As described above, in the information processing system 100 according to the second embodiment, when the execution of the process P by the multiple edge devices E on the data is canceled, the managing device 101 calculates the latency to be taken for the process P by each of the multiple edge devices E. Then, the managing device 101 may determine, based on the calculated latency of each of the edge devices E and the processing time period of the process P by each of the edge devices E, whether the process P is to be executed by each of the edge devices E and whether the result of executing the process P is to be stored in each of the edge devices E.

Thus, when the process of collecting data from the multiple edge devices E is canceled, a resource may be efficiently used by selecting only an edge device E that contributes to a reduction in an entire processing time period, and causing the selected edge device E to execute the canceled process P and store the result of executing the process P.

The managing device 101 may extend the storage time period for storing the result of executing the process P based on the frequency with which the result, stored in the storage 610, of executing the process P is used. Thus, a storage resource may be efficiently used by holding data (execution result) that is used with a high frequency and deleting data that is used with a low frequency.

When the storage time period for storing the result of executing the process P in the storage 610 is extended and exceeds the certain time period, the managing device 101 may disclose the result of executing the process P. Thus, data that is frequently used and stored for a time period longer than the storage time period may be disclosed and made searchable on the Internet or the like and may be used by another analyst or an application.

The information processing method described in the second embodiment may be enabled by causing a computer, such as a personal computer or a workstation, to execute a program prepared in advance. The information processing program may be stored in a computer-readable storage medium, such as a hard disk, a flexible disk, a CD-ROM, a DVD, or a USB memory, and may be read by the computer from the storage medium and executed by the computer. The information processing program may be distributed via a network, such as the Internet.

Each of the edge devices Ei and the managing device 101 that are described in the second embodiment may be enabled by an application specific integrated circuit (ASIC), such as a standard cell ASIC or a structured ASIC, or a programmable logic device (PLD), such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
circuitry coupled to the memory and configured to determine, when execution of a process on data is canceled in accordance with a cancellation request from a source that has requested the process, whether the process is to be executed and whether a result of executing the process is to be stored, based on a processing rate of the process by the information processing device,
the circuitry determines, based on the processing rate of the process and a rate of transfer of the result of executing the process to the source that has requested the process, whether the process is to be executed and whether the result of executing the process is to be stored.

2. The information processing device according to claim 1, wherein the circuitry determines, based on the processing rate of the process and a rate of reading of the data from storage storing the data, whether the process is to be executed and whether the result of executing the process is to be stored.

3. The information processing device according to claim 1, wherein when the circuitry determines that the process is to be executed and that the result of executing the process is to be stored, the circuitry causes a processing section of the information processing device to execute the process, associates the result of executing the process with information identifying the data and the process, and causes the result of executing the process to be stored in storage of the information processing device.

4. The information processing device according to claim 3, wherein when the remaining number of times that data is able to be written to the storage is equal to or smaller than a predetermined value, the circuitry determines that the process is not to be executed and that the result of executing the process is not to be stored.

5. The information processing device according to claim 1, wherein a storage time period for storing the result of executing the process is extended based on a frequency with which the result of executing the process is used.

6. A non-transitory computer-readable storage medium storing a program that causes a processor included in an information processing device to execute a process, the process comprising:
 canceling execution of a process on data; and
 determining, when the execution of the process on the data is canceled in accordance with a cancellation request from a source that has requested the process, whether the process is to be executed by the information processing device and whether a result of executing the process is to be stored in the information processing device, based on a processing rate of the process,
 the determining is executed to determine, based on the processing rate of the process and a rate of transfer of the result of executing the process to the source that has requested the process, whether the process is to be executed and whether the result of executing the process is to be stored.

7. The non-transitory computer-readable storage medium according to claim 6, wherein the determining is executed to determine, based on the processing rate of the process and a rate of reading of the data from storage storing the data, whether the process is to be executed and whether the result of executing the process is to be stored.

8. An information processing system comprising:
 a first information processing device; and
 a second information processing device that executes a process on data in accordance with a process request from the first information processing device,
 the second information processing device determines, when the execution of the process is canceled in accordance with a cancellation request from the first information processing device, whether the process is to be executed and whether a result of executing the process is to be stored, based on a processing rate of the process by the second information processing device,
 the second information processing device determines, based on the processing rate of the process and a rate of transfer of the result of executing the process to the first information processing device, whether the process is to be executed and whether the result of executing the process is to be stored.

9. The information processing system according to claim 8, wherein the second information processing device determines, based on the processing rate of the process and a rate of reading of the data from storage storing the data, whether the process is to be executed and whether the result of executing the process is to be stored.

10. The information processing system according to claim 8, wherein when the execution of the process by multiple information processing devices on the data is canceled, the first information processing device determines, based on latency to be taken for the process by each of the multiple information processing devices and a processing time period of the process by each of the multiple information processing devices, whether the process is to be executed by each of the information processing devices and whether a result of executing the process is to be stored in each of the information processing devices.

11. The information processing system according to claim 10, wherein the first information processing device determines, based on a result of comparing a time period obtained by subtracting a processing time period of the process by an information processing device that is among the multiple information processing devices and of which latency is the longest among latency of the multiple information processing devices from the longest latency of the information processing device, whether the process is to be executed by another information processing device, which is among the multiple information processing devices and of which latency is the second longest among the latency of the multiple information processing devices, and whether a result of executing the process is to be stored in the other information processing device.

12. The information processing system according to claim 10, wherein the latency of each of the information processing devices is calculated based on a processing rate of the process by each of the information processing devices, a rate of reading of the data by each of the information processing devices, and a rate of transfer of a result of executing the process from each of the information processing devices.

* * * * *